(12) United States Patent
Samji et al.

(10) Patent No.: US 7,958,543 B2
(45) Date of Patent: Jun. 7, 2011

(54) ACCOUNT SYNCHRONIZATION FOR COMMON IDENTITY IN AN UNMANAGED NETWORK

(75) Inventors: Mohammed Samji, Bellevue, WA (US); John Brezak, Woodinville, WA (US); Chris Guzak, Kirkland, WA (US); Giles Edward van der Bogert, Redmond, WA (US); Nicholas John Tomacelli, Issaquah, WA (US); Anil Kumar Yadav, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 662 days.

(21) Appl. No.: 11/179,764

(22) Filed: Jul. 12, 2005

(65) Prior Publication Data

US 2007/0016630 A1 Jan. 18, 2007

(51) Int. Cl.
| G06F 17/30 | (2006.01) |
| G06F 15/177 | (2006.01) |
| G06F 15/173 | (2006.01) |
| G06F 15/30 | (2006.01) |
| H04L 29/06 | (2006.01) |

(52) U.S. Cl. ............. 726/4; 709/220; 709/203; 709/243
(58) Field of Classification Search .................... 707/204
See application file for complete search history.

(56) References Cited

U.S. PATENT DOCUMENTS

| 5,708,812 A | 1/1998 | Van Dyke et al. |
| 5,968,121 A | 10/1999 | Logan et al. |
| 6,049,809 A | 4/2000 | Raman et al. |
| 6,144,959 A * | 11/2000 | Anderson et al. ..................... 1/1 |
| 6,751,634 B1 | 6/2004 | Judd |
| 6,839,752 B1 | 1/2005 | Miller et al. |
| 6,879,564 B2 | 4/2005 | Parham et al. |
| 7,263,560 B2 * | 8/2007 | Abdelaziz et al. ............. 709/238 |
| 7,275,102 B2 * | 9/2007 | Yeager et al. ................. 709/224 |
| 7,392,375 B2 * | 6/2008 | Bartram et al. ................ 713/152 |
| 7,613,812 B2 * | 11/2009 | Manion et al. ................. 709/227 |
| 2002/0023132 A1 | 2/2002 | Tomabene et al. |
| 2002/0156917 A1 * | 10/2002 | Nye .............................. 709/238 |
| 2002/0194171 A1 | 12/2002 | Judd et al. |
| 2003/0028594 A1 | 2/2003 | Laschkewitsch et al. |
| 2003/0056093 A1 * | 3/2003 | Huitema et al. ............. 713/156 |
| 2003/0163702 A1 * | 8/2003 | Vigue et al. .................. 713/176 |
| 2003/0201734 A1 * | 10/2003 | Krieger et al. ................ 315/291 |
| 2004/0003086 A1 | 1/2004 | Parham et al. |
| 2004/0210767 A1 | 10/2004 | Sinclair et al. |
| 2004/0260565 A1 * | 12/2004 | Zimniewicz et al. ............. 705/1 |
| 2005/0021574 A1 | 1/2005 | Miller et al. |

* cited by examiner

*Primary Examiner* — Brent Stace
*Assistant Examiner* — Sabana Rahman
(74) *Attorney, Agent, or Firm* — Shook Hardy & Bacon

(57) ABSTRACT

A platform supports an unmanaged secured workgroup, without a server, for common user access and secure resource sharing among the computers in the group. User accounts are synchronized by replicating and modifying the accounts at each computer of the unmanaged secured workgroup. A computer advertises a change in account information to other computers in an unmanaged secured workgroup. If one of computers in the unmanaged secured workgroup determines that the change is not reflected in the current account information, the computer requests the updated account information from the advertising computer. Any conflicts between user accounts at different computers are resolved before synchronizing the user account in the unmanaged secured workgroup. Also, an application program interface (API) enables an application to query properties of a networked computer system and an unmanaged secured workgroup and to join the unmanaged secured workgroup.

14 Claims, 16 Drawing Sheets

ACCOUNT SYNCHRONIZATION FOR COMMON IDENTITY IN AN UNMANAGED NETWORK

BACKGROUND

With the advancements in computer network technologies, large computer networks have become quite complicated with sophisticated administration schemes for managing user access and security of the network. For instance, a large computer network typically has multiple domains, each having a primary domain controller that contains a database of usernames, passwords and permissions for machines in its domain.

In contrast, small-scale local networks, such as home networks and small business networks, have remained rather simple and unsophisticated. Most of the small-scale networks are unmanaged in that there are no dedicated entities, such as domain controllers in a large network, for handling account information in a centralized manner. The machines in such an unmanaged network typically are connected to the same network hub and operate as a loose peer-to-peer group (sometimes called a "workgroup") intended only to help users find such things as printers and shared folders within the workgroup. Otherwise, the machines operate like stand-alone machines. As a result, the unmanaged network offers little additional value to the users.

There is no effective security administration, and the machines are not well integrated to facilitate network access and resource sharing. Local accounts must be manually created on every machine, and there is no relationship between accounts on different machines in the workgroup. Thus, a user may be able to log onto one machine but not another machine in the same network because the user's account has not been set up on the other machine. There is no reliable mechanism to enumerate the computers in the network. Also, the sharing of resources on the machines can be difficult to implement and maintain and difficult to manage to provide security.

SUMMARY

A networked computer system often supports a user that may migrate from one computer to another computer. In view of the foregoing, the present invention provides a platform for organizing multiple computers on a computer network in an unmanaged secured workgroup without a server. The unmanaged secured workgroup provides common user access and secure resource sharing among the computers in the group. According to an aspect of the invention, user accounts are synchronized at each computer of the unmanaged secured workgroup if user account information is modified or added at one of the computers of the unmanaged secured workgroup. User accounts may be replicated or modified to synchronize the account information in the unmanaged secured workgroup.

With another aspect of the invention, a computer advertises a change in account information to other computers in an unmanaged secured workgroup. If one of computers in the unmanaged secured workgroup determines that the change is not reflected in the current account information, the computer may request the updated account information from the advertising computer.

With another aspect of the invention, the invention determines whether a conflict exists in a user account before synchronizing the updated user account in an unmanaged secured workgroup. When the conflict is resolved, the changed user account is replicated at the computers of the unmanaged secured workgroup.

With another aspect of the invention, an application program interface (API) enables an application to query properties of a networked computer system and an unmanaged secured workgroup. In an illustrative embodiment of the invention, an API provides a list of unmanaged secured workgroups within the computer network, provides information about a specified unmanaged secured workgroup, provides information about a specified computer within the unmanaged secured workgroup, creates a new unmanaged secured workgroup, and allows a computer to join or to leave an unmanaged secured workgroup.

With another aspect of the invention, a requesting computer joins an unmanaged secured workgroup by establishing trust with a member computer in the unmanaged secured workgroup. The member computer authenticates the requesting computer. The requesting computer establishes an account on the member computer using a self-signed certificate. The requesting computer subsequently stores information regarding the unmanaged secured workgroup and publishes itself as a member of the unmanaged secured workgroup.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

Figure 1:
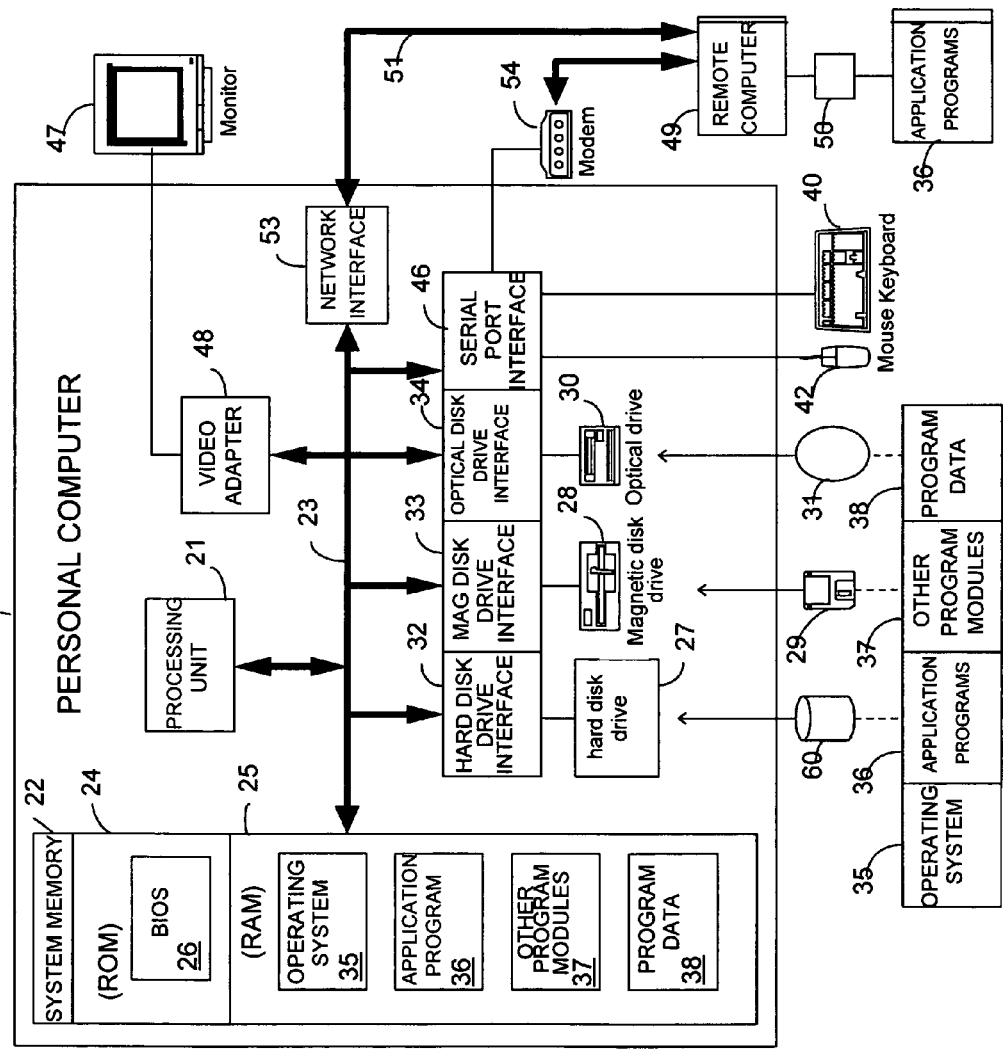
FIG. 1 is a block diagram generally illustrating an exemplary computer system that may be used in a small-scale unmanaged secured workgroup in accordance with an illustrative embodiment of the invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Definitions for the following terms are included to facilitate an understanding of the detailed description:

Domain—A group of networked computers that is centrally managed by a domain controller (e.g. a server). The domain controller manages user access and security for the domain. The domain controller typically contains a database of user names, passwords, and permissions for computers (machines) in the domain.

Unmanaged Secured Workgroup—A peer-to-peer group of networked computers in which user access and security are provided without a server. Typically, an account data structure is maintained at each computer (machine) within the peer-to-peer group. An unmanaged secured workgroup may be conceptually viewed as a secured group of computers that resides in the local network, wherein the computers work together to protect themselves from possible intrusions by users and machines on the outside, while users in the secured group are given a high degree of freedom and cooperation in accessing the machines and resources of the group.

The following describes a general-purpose computing device that may be used in a small-scale unmanaged secured workgroup in accordance with illustrative aspects of the invention. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that the acts and operations described hereinafter may also be implemented in hardware.

Figure 2:
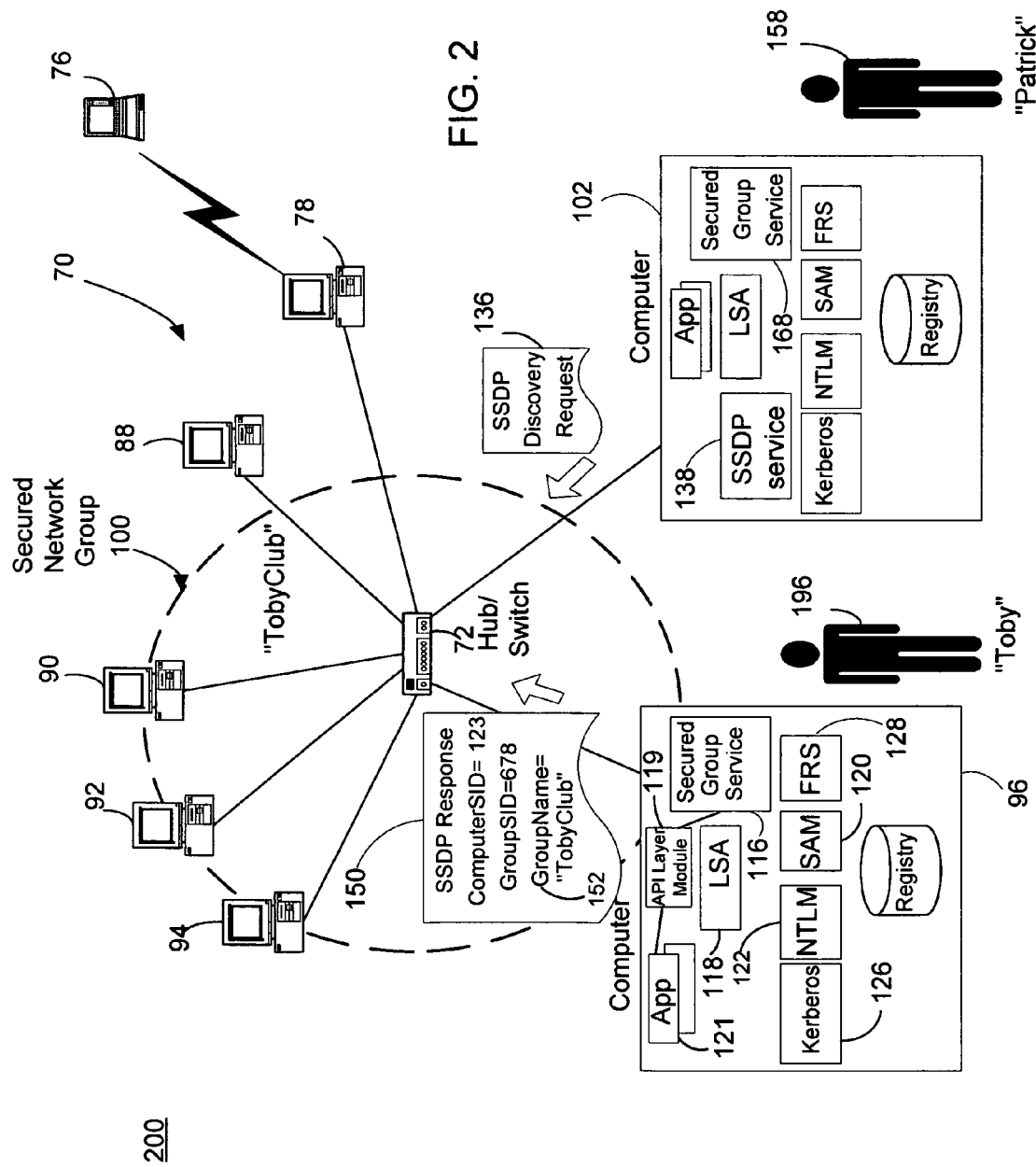
FIG. 2 is a schematic diagram showing a local computer network on which a small number of computers are formed into an unmanaged secured workgroup in accordance with an illustrative embodiment of the invention.

Referring now to FIG. 2, an illustrative embodiment of the present invention is directed to a platform for a small number of computers, e.g., ten (10) member computers or less, on an unmanaged local network 200 to form an unmanaged secured workgroup to provide group-wide control over user access and resource sharing, without the need to use a centralized management component. In an illustrative embodiment, unmanaged local network 200 is configured with a peer-to-peer association. Unmanaged local network 200 is classified as unmanaged because no central server manages and stores the user account information. In an unmanaged secured workgroup security policies and access controls are implemented group-wide to prevent unauthorized access and use of resources by computers or users not in the group, while allowing the sharing of resources within the group on a per-user basis.

In an illustrative embodiment of the invention, FIG. 2 shows a small local network 70, which is typical of home networks and small business networks. The local network is unmanaged in the sense that it does not have a centralized management component, such as a domain controller or the like. As shown in FIG. 2, the local network has a network hub or switch 72, and a plurality of computers (or computing devices) connected thereto. The connections between the computers may be wireless. For example, the device 76 is a wireless device that communicates with the network through an access point 78.

In accordance with illustrative aspects of the invention, some of the computers on the local network 70 may form an unmanaged secured workgroup. It will be appreciated that the unmanaged secured workgroup does not depend on the particular topology of the network. For instance, an unmanaged secured workgroup may be established in an ad hoc network formed by wireless devices. Due to the management concerns and the need to replicate data, the unmanaged secured workgroup platform works more effectively when the number of computers in the group is kept small. For example, the number of computers that can join a given unmanaged secured workgroup may be limited to a predetermined maximum number of computers (e.g., ten members in an unmanaged secured workgroup).

By way of example, as illustrated in FIG. 2, the computers 90, 92, 94, and 96 have formed an unmanaged secured workgroup 100 (indicated schematically by the dashed lines connecting the computers) that has a user-friendly name "Toby-Club". A new unmanaged secured workgroup can be created, if there is no existing group to join or if the user of a computer does not want to join any existing group. In this regard, in an illustrative embodiment of the invention, each computer can belong to only one unmanaged secured workgroup. As will be described in greater detail below, the computers in the unmanaged secured workgroup have established trust among themselves, and share information such as user account data and user profile data within the group. A new computer, such as the computer 102, can join the unmanaged secured workgroup 100, and computers in the group can leave the secured workgroup and, in special cases, be evicted from the group.

Figure 3:
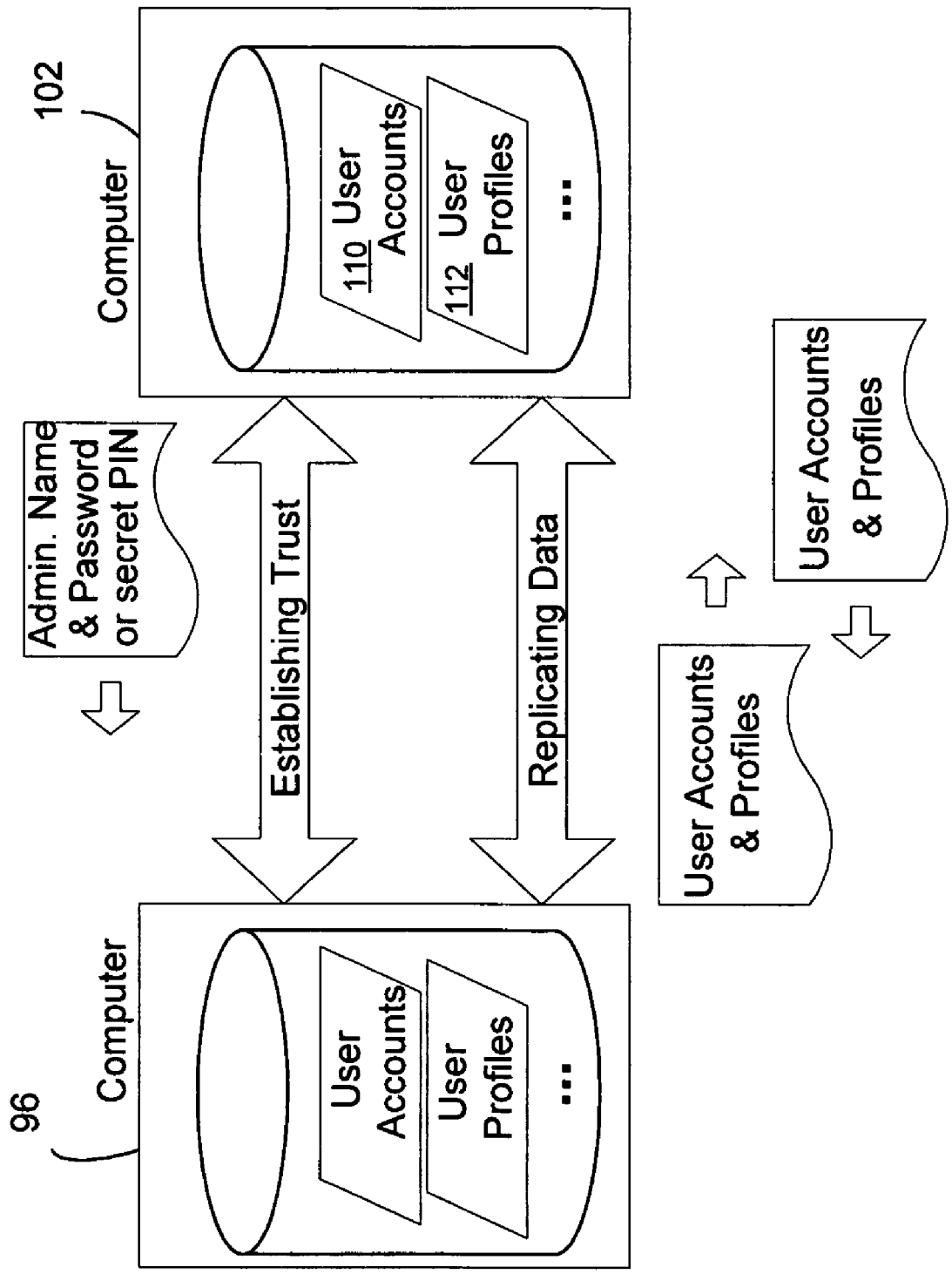
FIG. 3 is schematic diagram illustrating the establishment of trust and replication of user accounts and user profiles between two computers in an unmanaged secured workgroup in accordance with an illustrative embodiment of the invention.

The concept underlying the formation of a small-scale unmanaged secured workgroup on an unmanaged local network is illustrated in FIG. 3. For a computer 102 to join another computer 96 in order to form an unmanaged secured workgroup, the computer 102 has to first establish trust with the second computer 96. This happens either when the computer 102 wants to join an existing secured workgroup to which the computer 96 belongs, or when the computer 102 responds to an invitation from the computer 96 to form a new group. There are many different ways to establish trust between the two computers. Typically, establishing trust requires one computer to authenticate itself to the other by showing that it knows some secret known to the other. In an illustrative embodiment of the invention, the secret is the user name and password of a group administrator accepted by the other computer. In another illustrative embodiment, the secret is a random personal identification number (PIN) generated by the other computer. In some implementations, mutual authentication between the two computers may be required. It will be appreciated that the particular way to establish trust between the two computers is not critical to the invention.

After the trust between the computers 96 and 102 has been established, the computers form an unmanaged secured workgroup or, if the computer 96 belongs to an existing unmanaged secured workgroup, the computer 102 is accepted into that group. To that end, in an illustrative embodiment, each unmanaged secured workgroup and each node in the secured workgroup is assigned a GUID (Globally Unique Identifier), which is a unique identifier. When a computer becomes a member of an unmanaged secured workgroup (either by creating a new group or joining an existing group), the machine's GUID and GUIDs of user accounts on that machine are changed or recreated to the group's GUID to reflect the network group's authority/identities.

After the formation of an unmanaged secured workgroup, user account data and user profiles are replicated to each computer in the group. As illustrated in FIG. 3, the user account data 110 on the computer 96 are replicated to the computer 102, and vice versa. After the user accounts are replicated, user profiles 112 associated with the user accounts are replicated to the other computers. The term "user profile" is used herein to mean data pertaining to a specific user. For instance, the user profile may include registry settings for that user, selected documents of the user, and security policies, the user tile (i.e., an iconic representation of the user), and settings, configurations and files for personalizing user sessions, etc. The particular contents of the user profile depend on the implementation. An administrator of the secured workgroup can create user accounts and set security policies on one computer in the group, and the accounts and security policies are replicated to all the machines in the secured workgroup. Since each computer in the group has all the user accounts and user profiles, a user that has a valid account can log on to any computer in the group using her user name and password. Replicating data such as user tiles and settings, configurations, and files for personalized user sessions also allow the user to have a uniform user experience across the computers in the unmanaged secured workgroup. In an embodiment of the invention, a subset of account data and user profiles may be virtually unified rather than literally synchronized. An embodiment of the invention supports application virtualization/synchronization, in which a user installs an application on a member of the unmanaged secured workgroup and may use the application from any other member of the unmanaged secured workgroup without installing the software on the other member.

Returning to FIG. 2, in an illustrative embodiment of the invention, a computer 96 capable of participating in an unmanaged secured workgroup is provided with a secured group service module 116 for handling the creation, joining, and operations of unmanaged secured workgroups. The computer 96 also has a local security authority (LSA) 118, and a security account manager (SAM) 120. The local security authority 118 is a user mode process that is responsible for the local system security policies, user authentication, and sending security messages to an event log of the operating system. The security policies specify, for example, which users are allowed to log onto the machine, password policies, privileges granted to users and groups, and system security auditing settings, etc. The security account manager 120 manages a database stored in the system registry of the computer that contains data identifying users and groups allowed to access the machine, along with their passwords and other attributes. The computer further includes one or more authentication modules, such as the Windows NT® LAN Manager (NTLM) module 122 or Kerberos module 126, for performing authentication operations according to a selected authentication protocol. Furthermore, a File Replication Server (FRS) 128 is used for replicating data and files, including user accounts and profiles, to other computers in the unmanaged secured workgroup.

In the embodiment shown in FIG. 2, an application 121 interfaces with secured group service module 116 for handling the creation, joining, and operations of unmanaged secured workgroups through API layer module 119. As will be discussed, API layer module 119 supports an application program interface (API) for obtaining information about unmanaged secured workgroups, creating an unmanaged secured workgroup, joining an unmanaged secured workgroup, and leaving an unmanaged secured workgroup.

Figure 4:
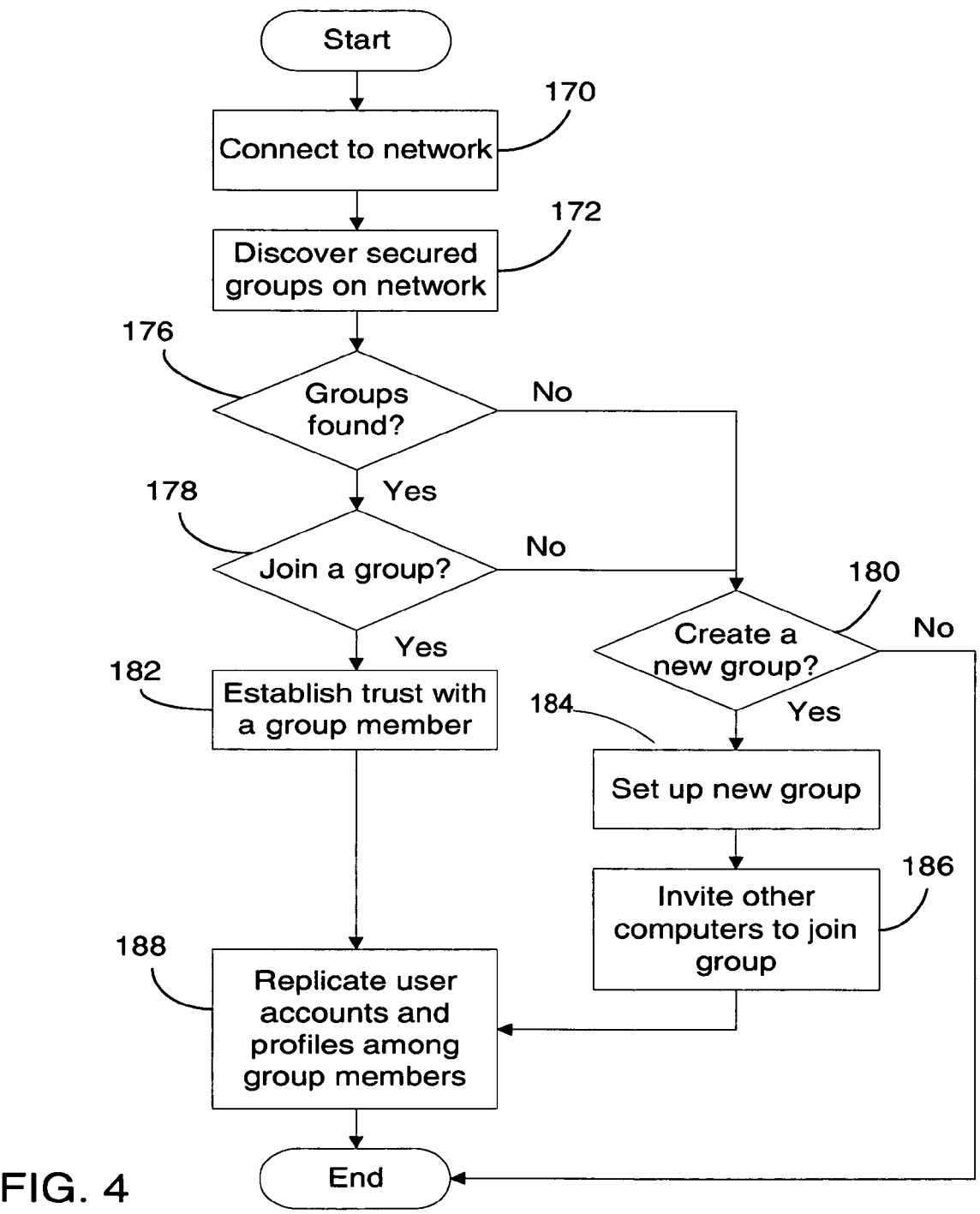
FIG. 4 is a flowchart showing a process for a computer to join an unmanaged secured workgroup in accordance with an illustrative embodiment of the invention.

Referring now to both FIGS. 2 and 4, in an illustrative embodiment of the invention, when a standalone computer 102 is connected to the local network 70 and turned on (step 170), its operating system automatically discovers whether there are unmanaged secured workgroups existing on the local network (step 172). To that end, the computer 102 broadcasts a discovery request 136 according to the Simple Service Discovery Protocol (SSDP) to detect the other machines connected to the local network. In this regard, the secured group service module 116 on a computer 96 that belongs to a secured workgroup has already registered the friendly name and GUID of the secured workgroup with a SSDP service 138 of the computer. In response to the SSDP request, each computer on the local network 70 returns a response. The response identifies the responding computer and whether it is part of an unmanaged secured workgroup and, if so, information regarding that group. For instance, the response 150 from the computer 96 includes a group name 152 indicating that it is a member of the unmanaged secured workgroup called "TobyClub."

Figure 5:
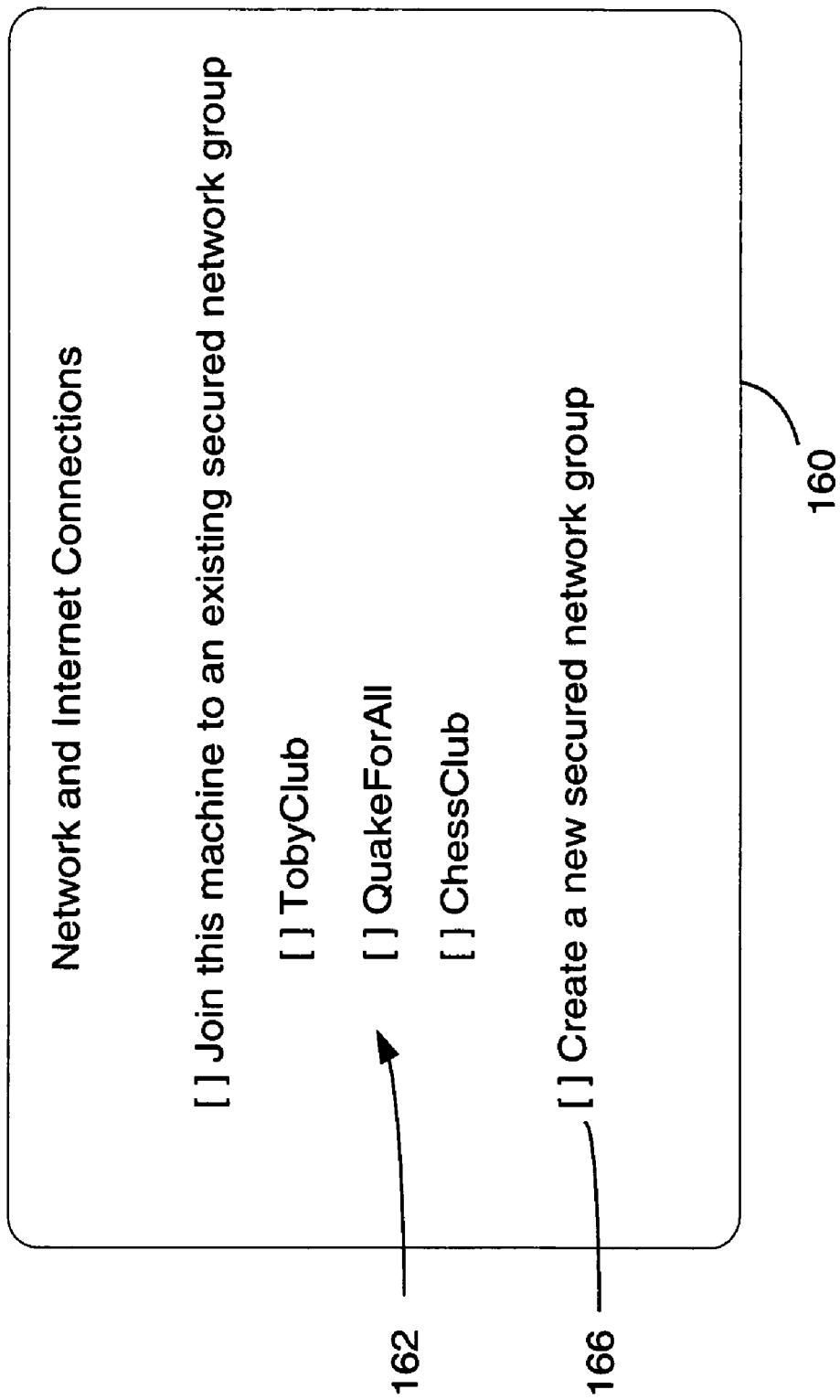
FIG. 5 is a diagram showing an exemplary user interface window that provides options to join or create an unmanaged secured workgroup in accordance with an illustrative embodiment of the invention.

In an embodiment of the invention, if the computer 102 detects one or more existing unmanaged secured workgroups on the local network (step 176), when its user 158 ("Patrick" in FIG. 2) logs in, a user interface window pops up, asking whether the user wants the computer to join any of the existing unmanaged secured workgroup (step 178). An example of the user interface window is shown in FIG. 5. The user interface window 160 provides a list 162 of existing unmanaged secured workgroups on the local network the computer has detected, and the user can select one to join by clicking on the name of the group. If no existing unmanaged secured workgroups on the local network have been detected, the list will be empty. The user interface also includes a query 166 to give the user the option of creating a new unmanaged secured workgroup. Thus, in the absence of an existing unmanaged secured workgroup, the user can select to create a new one (step 180). Even if there are unmanaged secured workgroups existing on the local network, the user can still choose to create a new one instead of joining any existing group. For example, if the computer 102 detects that the computer 88 on the local network is not a member of any secured workgroup (i.e., the computer 88 is a "standalone" machine), the user 158 may decide to create a new secured workgroup (a secured workgroup of one) (step 184) and invite the computer 88 to join the group (step 186).

If the user 158 ("Patrick") selects the option of creating a new unmanaged secured workgroup (step 180), the secured group service module 116 creates a new GUID for the new group, and changes the computer's account domain GUID to the new GUID of the group. The secured group service module 116 then creates a "Secured Group Nodes" group, which is a local security group that contains computer accounts representing the computers in that unmanaged secured workgroup. ("Secured Group Nodes" is an example of a group name. The embodiment supports other group names as well.) Only computers listed in the Secured Group Nodes group can perform replication with other computers in the group. Accounts may be created with strong, random passwords.

The secured group service 168 also creates a "Secured Group Administrators" group for holding credentials of the administrator(s) of the new unmanaged secured workgroup. Only an administrator identified in the Secured Group Administrators group is allowed to add or remove nodes in the secured group. A "Secured Group Admin" account is created, and the user 158 is prompted to enter a good (non-blank) password. ("Secured Group Administrators" is an example of a group name. (As will be discussed, embodiments of the invention support a personal identification number (PIN) which may be used as an alternative to or in addition to a password.) The embodiment supports other group names as well.) After the user enters a password, the Secured Group Admin account is added to the Secured Group Administrators group.

If, on the other hand, the user 158 chooses to join an existing unmanaged secured workgroup detected by the computer 102 (step 178), one of the nodes in that group that have responded to the SSDP request is chosen, and a connection is established to the remote procedure call (RPC) interface of the secured group service of that selected node. In the example illustrated in FIG. 2, the computer 102 has chosen to talk to the computer 96. The computer 96 then issues a request for the computer 102 to authenticate itself. By properly authenticating itself, the computer 102 establishes trust with the computer 96 (step 182). In doing so, the computer 102 also establishes trust with the remaining nodes of that group 100 since they trust the computer 96 and are supposed to trust any computer trusted by the computer 96. In an alternative embodiment, however, a computer that wants to join an unmanaged secured workgroup may be required to establish trust individually with each of the computers in the group.

As described above, a common way to establish trust is for the computer to present a secret known to the other computer. In an embodiment of the invention, self-signed certificates for mutual authentication among peers are utilized. A target node's certificate may be passed back to the authenticated joining computer. In an illustrative embodiment of the invention, the secret is the name and password of a group administrator that is registered in the Secured Group Administrators group of the target node computer 96. In response to the challenge from the target node computer 96, the computer 102 prompts the user 158 to enter a valid administrator name and password. In one illustrative implementation, the administrator 196 (illustrated in FIG. 2 as "Toby") may simply walk over to the computer 102 that wants to join the unmanaged secured workgroup and enter his user name and password. The computer 102 transmits the entered administrator name and password to the target node computer 96. The target node computer 96 checks the administrator name and password returned by the computer 102. If they are valid and correspond to an administrator account found in the Secured Group Administrators group, computer 102 becomes a member of the unmanaged secured workgroup 100. The target node computer 96 creates a computer account for the joining computer 102 and passes back the target node computer's secret to the joining computer 102. The joining computer 102 then saves the target node computer's secret. At this point, the joining computer 102 will initiate a "sync" operation with the target node computer 96. After completion of the sync operation, full trust is established.

Thereafter, user accounts and user profiles are replicated upon change among the members of the unmanaged secured workgroup (step 188). In one illustrative implementation, a computer that is a member of an unmanaged secured workgroup periodically (e.g., every 4 minutes) sends a "Hello" message to all other nodes in the group. The Hello message contains the group GUID, the node's current system time, and the last update count of the replication. The other group members are not required to respond, but will update their table of group members accordingly and record the last time that a "Hello" was received from that member. When a SAM change is received from the LSA, the secured group service on the computer sends a "Notify" message to all nodes in the secured workgroup. When a group node receives the Notify message, it compares the UpdateCount in the message to its current UpdateCount. If the received UpdateCount is newer than the current UpdateCount, the recipient calls back to the sender for a specific list of changes and applies those changes locally.

In an alternative illustrative embodiment, instead of using the administrator name and password as a secret, the target node computer 96 generates a random personal identification number (PIN) as the secret. The user 196 ("Toby") of the target node computer 96 gives the secret PIN to the user 158 ("Patrick") of the computer 102 that wants to join the group. The user 158 then enters the PIN into the computer 102 in response to the prompt, and the PIN is delivered to the target node 96 via the network connection in order to establish trust.

Figure 6:
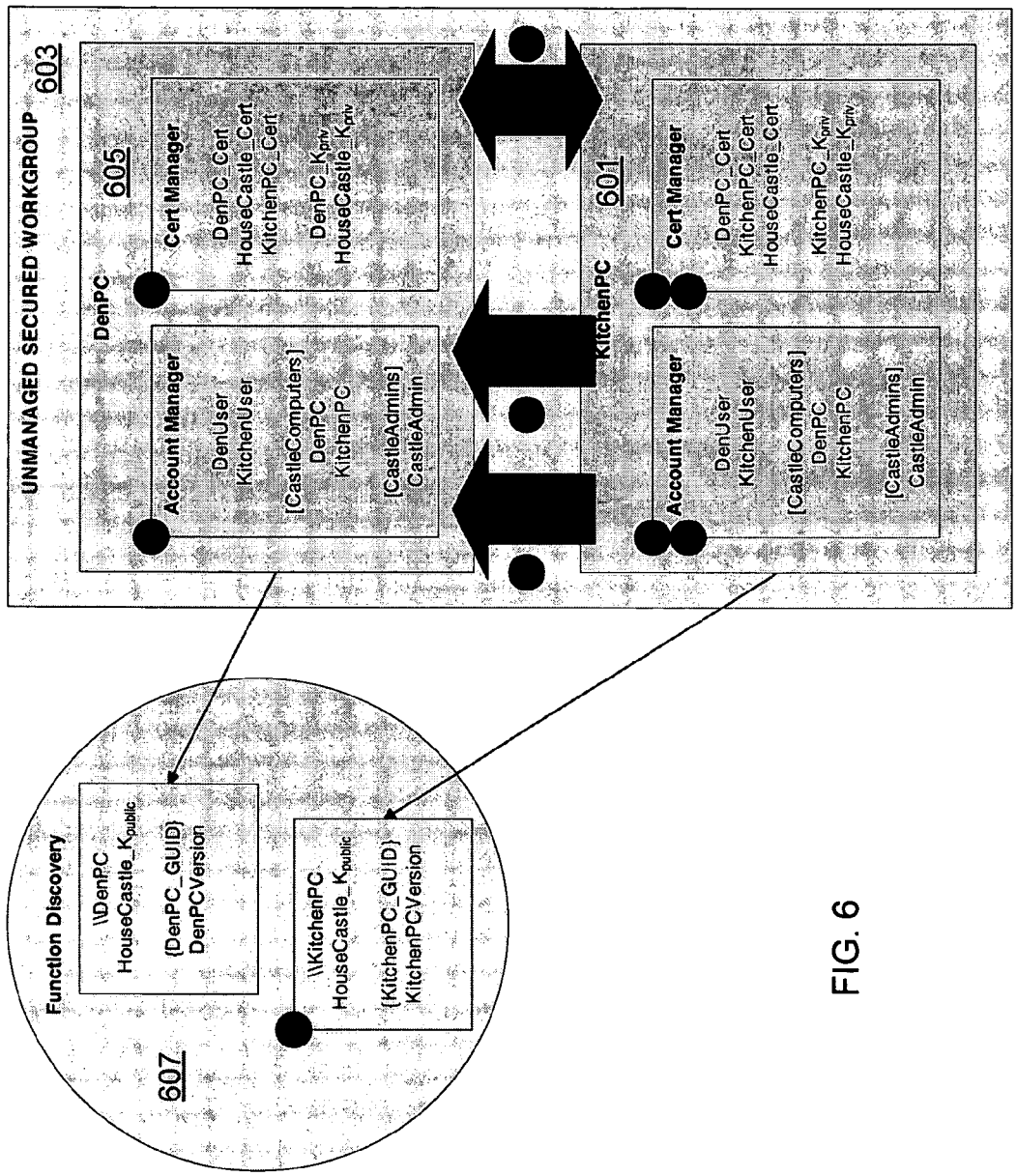
FIG. 6 illustrates a scenario for joining a computer to an unmanaged secured workgroup in accordance with an illustrative embodiment of the invention.

FIG. 6 shows an illustrative scenario for computer system (KitchenPC) 601 to join unmanaged secured workgroup 603 in accordance with an embodiment of the invention. (Other embodiments of the invention may utilize other techniques in providing authentication of machines wishing to join unmanaged secured workgroup 603.) In the exemplary scenario, computer system (DenPC) 605 is already a member of unmanaged secured workgroup 603. Join is the process by which an unjoined machine coordinates with a member of an existing unmanaged secured workgroup to acquire membership in that unmanaged secured workgroup. In this illustrative implementation, there are ten principal steps:

1) KitchenPC 601 authenticates DenPC 605 as a member of the unmanaged secured workgroup 603 by challenging DenPC 605 with HouseCastle_$K_{public}$. If DenPC 605 responds correctly, it proves DenPC 605 knew the shared secret.
2) KitchenPC 601 generates a public/private key pair and generates a self-signed certificate, KitchenPC_Cert.
3) KitchenPC 601 creates a KitchenPC account for itself and associates KitchenPC_Cert with the account.
4) KitchenPC 601 logs in to DenPC 605 using the administrator's well-known-account and the administrator's password provided by the user driving the join. KitchenPC 601 passes its certificate along to DenPC 605.
5) DenPC 605 installs KitchenPC's certificate.
6) DenPC 605 creates a machine account for KitchenPC 601, associates the account with KitchenPC_Cert, and then enters the certificate into unmanaged secured workgroup 603.
7) DenPC (603) returns its own certificate and the shared secret to KitchenPC (601) who:
   a. Installs DenPC_Cert.
   b. Stores the shared secret.
   c. Generates a copy of HouseCastle_Cert from the private key and installs the copy.
8) KitchenPC (601) creates a machine account for DenPC 605 and associates the account with DenPC_Cert.
9) KitchenPC 601 publishes (broadcasts) itself as a member of the unmanaged secured workgroup via Function Discovery 607.
10) KitchenPC 601 initiates a synchronization operation with DenPC 605. (In the previous steps, KitchenPC 601 and DenPC 605 merely established mutual trust. Once they have mutual trust, a synchronization operation populates each computer with the full set of certificates, accounts, and groups from the other.)

It will be appreciated that communications during the phase of establishing trust and the subsequent communications among the group members for duplicating user accounts, user profiles, and other data in connection with the operations of the group should be properly protected by digital signatures and encryption to protect the integrity and confidentiality of the data. (In an embodiment of the invention, a public/private key based authentication mechanism (PK/SChannel authentication) is used. The public key is placed in a self-signed certificate that is later used to verify the identity of the holder of the private key.) To that end, the communications may follow a suitable authentication protocol, such as the NTLM or Kerberos. In one illustrative implementation, the nodes of the unmanaged secured workgroup replicate using (DCE) RPC employing the NTLM authentication mechanism. The channel is protected with call-level authentication and privacy, and access control is based on server-based checks for the caller being a member of the unmanaged secured workgroup. The use of authentication measures prevents other computers on the local network from eavesdropping and tampering with the communications between the nodes in the unmanaged secured workgroup.

After joining an unmanaged secured workgroup 100, a computer 102 can voluntarily leave the group. To do so, the user 158 logs onto the machine 102 to be removed from the unmanaged secured workgroup and through an appropriate user interface window chooses to leave the group. In one illustrative implementation, when a computer leaves the unmanaged secured workgroup, the computer is removed from the Secured Group Nodes group, and its corresponding computer account is deleted. This action breaks the trust used to replicate the accounts. With the computer leaving the group, the Secured Group Administrators and Secured Group Nodes groups are deleted along with all computer accounts. The computer GUID, however, is left the same as it had while joined to the group. After being removed from the group, the computer 102 becomes a standalone computer on the local network so that workgroup 100 becomes an unmanaged secured workgroup of one. (However, computers may subsequently join workgroup 100 after becoming an unmanaged secured workgroup of one.) It is no longer trusted and will not receive any further updates of user accounts and profiles.

In some special situations, a computer may be "evicted" from an unmanaged secured workgroup. For instance, if a computer in the group has been stolen, it may be necessary to evict that computer from the group so that someone cannot later use it to access the data and resources of the group. The evicted computer is removed from the Secured Group Nodes group and its account in the group is deleted. This prevents replication of account information to the evicted computer in the future. Nevertheless, other measures may be used to completely cut the evicted computer off from the group. Since the evicted computer has a full copy of the account database (including passwords), the evicted computer may try to authenticate itself as any other user (or computer) and still gain access to the secured workgroup. As such, measures should be taken so that the residual secrets can be changed without the evicted computer being able to eavesdrop on the communications and see the passwords. As part of the eviction process, the computer's secrets may have to be changed off-line before any user secrets are changed. The changing of the computer's secret may be done "out-of-band" on a private channel, such as by using a floppy disk to carry the secret. In one implementation, after evicting a computer, the administrator 196 of the unmanaged secured workgroup has to recreate the group without the computer being evicted. As part of the recovery process, one computer ("the recovery computer") remaining in the group is isolated (i.e., removed from the network) and used to stage the group recovery. A new random LSA secret is generated for each computer remaining in the group and stored as the new computer password for the computer in the recovery computer's local account database. The new secrets, however, cannot be transmitted over the network to the other computers due to the risk that the machine to be evicted may receive the updates. To deal with this problem, the administrator 196 creates an "eviction" floppy disk (or any other portable medium, such as CD ROM) for each remaining computer in the secured workgroup that contains the new LSA secret for that computer. The administrator logs on to each computer he wants to keep in the unmanaged secured workgroup with his administrator account and runs the eviction disk on the computer to change the password of that computer. Once the eviction disk is run on the machines remaining in the group, all users are required to change their passwords when they log onto computers in the group, because the evicted computer has all of the users' existing passwords (or at least the derived keys).

One advantage of the unmanaged secured workgroup according to at least some aspects of the invention is to make machine to machine communications secure. According to one aspect of the invention, self-signed certificates may be used between a member machine and a machine that requests to join an unmanaged secured workgroup. Also, the creation of an eviction floppy disk, as discussed above, may be distributed in which all machine accounts are reset to new random passwords at essentially the same time. With the resetting of passwords, the member machines will lose the ability to communicate; however, machines will gain the ability to communicate as the eviction floppy disk makes its rounds. Machines (e.g., the evicted machine) which never obtains the eviction floppy disk only possesses old passwords and are unable to communicate with the unmanaged secured workgroup. Another advantage of the unmanaged secured workgroup according to at least some aspects of the invention is to prevent unauthorized access via user accounts. According to one aspect of the invention, all user accounts are changed. According to another aspect of the invention, passwords may be set to expire on the next login.

One advantage of the unmanaged secured workgroup according to at least some aspects of the invention is that each user has an identity known to all computers in the group. As a result, a user can log onto any of the computers in the secured workgroup with the same user name and password. For instance, in a small business setting, an employee can log into any of the computers on the local office network that form a secured workgroup with the same user name and password, without the need to set up a user account separately on each of the computers. Also, when the user changes his password on one of the computers in the group, the change will be replicated to the other computers. Thus, an unmanaged secured workgroup may significantly simplify the creation and modification of user accounts and make the computers in the group much more "accessible" to authorized users.

The improved network integration of the computers in an unmanaged secured workgroup also allows user to enjoy the benefits of computer networking. After logging into any of the computers in the group, a user can access all of the user's documents using the user's own settings, regardless of where the documents and settings are actually stored. This is again made possible because all the documents of the user are associated with a single user identity that is recognized by all the computers. Thus, a query can be made to identify all the documents and setting of the given user. This enables a user to have a "unified" view of all her documents and settings over the entire secured workgroup.

As described above, the user profiles replicated among the computers in a secured workgroup may include documents of the users. In one illustrative embodiment, a pre-selected set of documents of a given user, e.g., those in the user's "MyDocuments" folder, are replicated to each computer in the secured workgroup automatically. When the user has modified one of the documents, the document revision is detected, and the modified document is replicated to the other computers in the group by the file replication service (FRS). In an illustrative embodiment of the invention, to reduce the amount of memory used by the computers for storing replicated documents, files that exceed a threshold size are not replicated. Instead, if a file exceeds a threshold size, only a link to the file on the computer that stores the file is replicated to the other computers.

The unmanaged secured workgroup also enables secured sharing of files between users of the group. A user that wants to share the user's document with a second user can modify the properties of the document to indicate that the second user is allowed to access the document. When the second user uses an application to access the document, the document properties are checked to confirm that the second user has been given access to the document. In one illustrative implementation, a user of a secured workgroup in a small business network can share a document only with one other user. In an alternative illustrative embodiment, a user of an unmanaged secured workgroup can share the user's files with all users of the group. This implementation may be applicable in a home network setting.

The unmanaged secured workgroup may allow computers that have not joined the group to have limited access to the group. For instance, a user may bring his laptop from work and connect it to his home network but select not to join the secured workgroup on the home network. In such as case, the non-member computer may be given a guest status and be allowed to access a pre-selected set of resources. Similarly, a legacy computer (i.e., one without the software for operations relating to an unmanaged secured workgroup) may still communicate with the computers in the unmanaged secured workgroup in the same way as it would in a conventional workgroup.

Once computers (machines) become part of an unmanaged secured workgroup, the user accounts and user groups are replicated and synchronized between member computers as changes occur for any member of the unmanaged secured workgroup. (A change may correspond to user account information being modified or user account information being added.) Computers participating in an unmanaged secured workgroup are peers with no designated master computer. Computers in an unmanaged secured workgroup may advertise changes over the network. This operation allows member computers to initiate replication and thus stay in synchronization with each other.

Computers participating in replication maintain the state of the data that the computers would replicate. The computers keep track of the following:
  Computer version number: This number is updated whenever any account on the computer is changed. This version number determines at a high level when a synchronization operation is required.
  Account version number: This number is updated whenever a particular account on the computer is changed. This version number is used to determine which accounts to synchronize when a synchronization operation is needed and is tracked per account.

Replication may be a pull-oriented replication in which each computer advertises its computer version number when it changes. When a member of an unmanaged secured workgroup detects that another member has advertised a new version number, the member checks that version number with the version number that it has in its record for that computer. If the member determines that newer data has been published by another computer, then it initiates a replication.

In an illustrative embodiment, all user accounts are replicated. All account groups are replicated; thus, a user who is an administrator on one computer will be replicated as an administrator on the other computers. The following data is replicated:
  User names
  User passwords
  User tiles
  Account version number: This data is used by an unmanaged secured workgroup to inform members when they should update their local data.
  User group name
  User group member list
  Computer version number: This data is used by an unmanaged secured workgroup to decide whether to start a synchronization operation with another computer.
  Unmanaged secured workgroup secrets: This data is the machine-to-machine secret that establishes trust between machines of an unmanaged secured workgroup.

Figure 7:
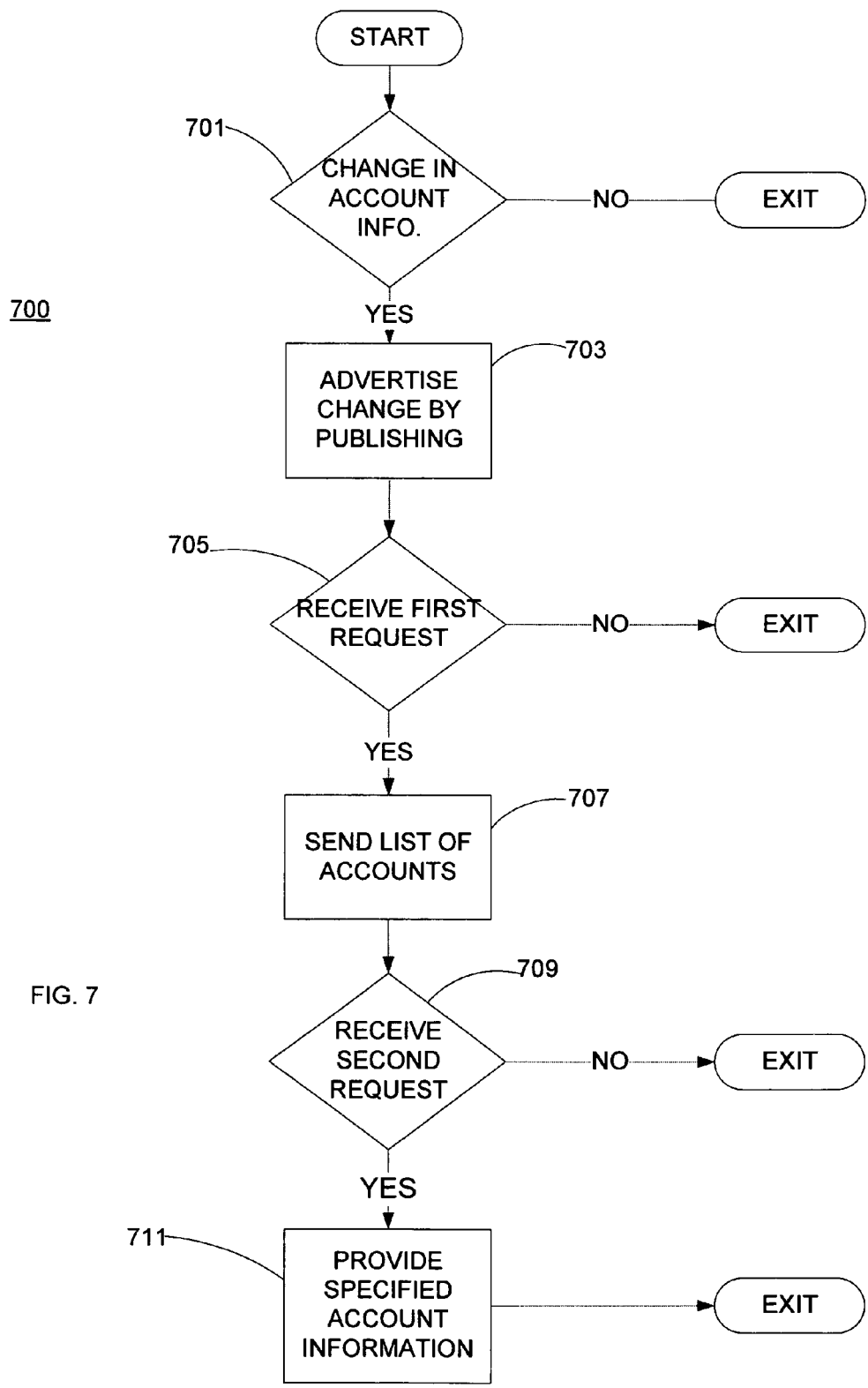
FIG. 7 shows a flow diagram for providing updated account information from a computer to another computer in an unmanaged secured workgroup in accordance with an illustrative embodiment of the invention.

FIG. 7 shows a flow diagram 700 for providing updated account information from a member computer to another computer in an unmanaged secured workgroup in accordance with an illustrative embodiment of the invention. In step 701 the member computer determines whether there is a change in the account information stored at the member computer. If there is no change, the process exits. If there is a change, the computer advertises the change by publishing the associated computer version number using a Function Discovery message in step 703. Embodiments of the invention may use other publication protocols, e.g., SSDP as previously discussed, to publish the associated computer version number. In step 705, the member computer determines whether a request has been received from another computer for a list of user accounts. If not, the process exits. If so, the member computer sends the list to the other computer in step 707. The other computer may further request specific account information if the corresponding account information has been updated or added at the member computer. In step 709, it is determined whether such a request has been received. If no further request has been received, the process exits. If a further request has been received, the member computer sends the specified account information to the other computer in step 711.

Figure 8:
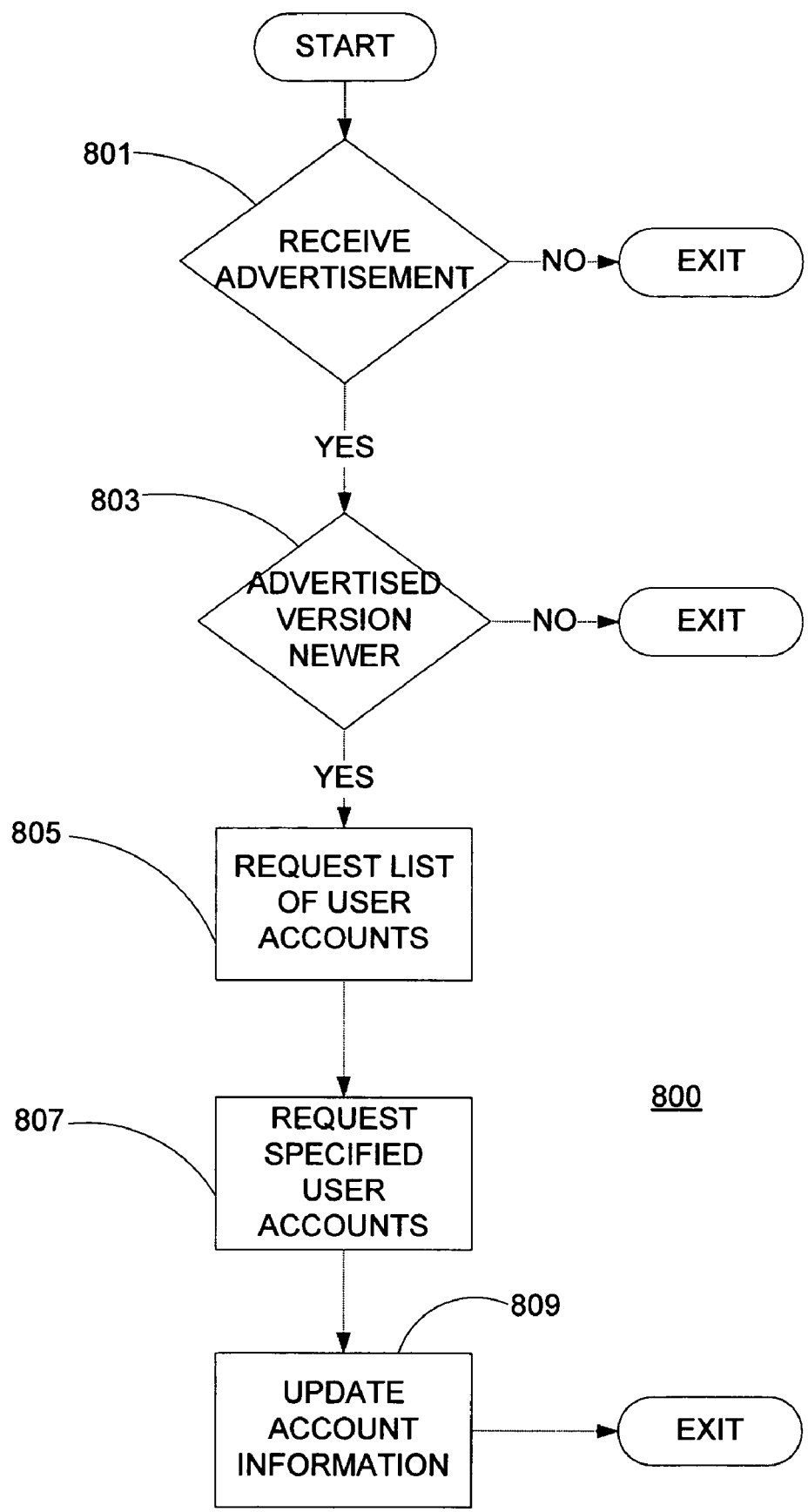
FIG. 8 shows a flow diagram for obtaining updated account information from a computer in an unmanaged secured workgroup in accordance with an illustrative embodiment of the invention.

FIG. 8 shows a flow diagram 800 for obtaining updated account information from the member computer in an unmanaged secured workgroup in accordance with an illustrative embodiment of the invention. (Flow diagram 800 corresponds to a process executed at the other computer as shown in FIG. 7.) In step 801, the other computer determines whether an advertisement has been received that the member computer has changed account information. If not, the process exits. If an advertisement has been received then in step 803 the other computer compares the advertised version number with the version it has on record for the member computer. If not, the process exits. If the advertised version is newer, then the other computer requests for a list of user accounts from the member computer in step 805. In step 807, the other computer makes a request for account information that has been updated or that is new. In step 809, the other computer updates the account information that is stored at the other computer after conflict resolution (as will be discussed).

While updated account information may be obtained in accordance with flow diagram 700, embodiments of the invention support other account updating processes. With an embodiment of the invention, a first member computer broadcasts an advertisement with an updated version number to indicate that a change in accounting information has occurred. A second member of the unmanaged secured workgroup, in response to the advertisement from the member computer, sends account version information to the first member computer. Consequently, the first member computer returns a list of newer user accounts to the second member computer.

When a new computer joins an unmanaged secured workgroup, it has no account data related to the unmanaged secured workgroup. At that time it updates itself with unmanaged secured workgroup data. Whenever any user account or group is changed on any participating members of an unmanaged secured workgroup, the change may be advertised via Function Discovery (or another publishing mechanism e.g., SSDP). The advertisement triggers a replication sequence between members of an unmanaged secured workgroup. Computers in the unmanaged secured workgroup advertise their changes to other computers by publishing their Computer Version Number via Function Discovery.

When a member leaves the unmanaged secured workgroup, the user may decide to delete certain accounts from that computer. This change, as well as the updated membership of the unmanaged secured workgroup, can be replicated to remaining members. When a member is evicted, the secrets of the unmanaged secured workgroup are changed. The change in secrets is propagated to other members in the unmanaged secured workgroup.

When a machine first joins an unmanaged secured workgroup, the initial trust between the machines is established by the logon of an administrator with a password. Once trust has been established, the machines may exchange self-signed certificates and authentication is performed by certificate based mutual authentication. (As previously discussed, other authentication mechanisms may be used.) Once a computer has authenticated with another computer, the computer can then replicate the account information.

With an illustrative embodiment of the invention, the security account manager (SAM) database is extended by storing new properties in an auxiliary property file. (The security account manager database contains defined users and groups along with corresponding passwords and other attributes.) The auxiliary property file (corresponding to data that is locally stored) is replicated when accounts are replicated. Moreover, the auxiliary property file can be expanded to include additional properties, e.g., user tile, password hint, account GUID, and account certificate.

An unmanaged secured workgroup includes multiple machines which are peers to each other. This means that changes to the same object can be made on any of the participating machines by a person with appropriate rights. Changes may be made both when the member machines are "on-line" as well as when the machines are "off-line". The changes made to machines when they are off-line may result in changes that conflict with user accounts or account groups as described in greater detail below. The unmanaged secured workgroup feature may utilize a mechanism to detect conflicts. Subsequently, the conflicts may be automatically resolved or resolved with the assistance of an authorized user.

A "change" to an account is defined as a change to any property of that account. The conflict resolution and detection may be performed at the "whole account level." (Additionally, conflict resolution and detection may be performed at the per-property level.) As an example, if one changes the tile on one machine on an account and changes the password of the same account on another machine, both accounts will be considered changed and thus will require conflict resolution, even though at the property level, the changes are non-overlapping.

Synchronization between two member machines is influenced by the time duration that the machines have been out of synchronization. If the machines have been apart for a long duration, then the differences between the machines are considered to be conflicts. In an illustrative embodiment, the differences are resolved by manual intervention using a management user interface (UI). An illustrative long duration would be when the last updated timestamp difference between the machines is at least 30 days, and an illustrative short duration is a disconnect between two member machines when the "last updated" timestamp between the machines is less than 30 days. The illustrative 30 day threshold is set so that most normal off-line scenarios, e.g., a machine being shut-down on a daily basis, can be handled automatically for conflict resolution. Since the user accounts and groups may not change very frequently, the above criterion is also used to determine how synchronization happens when a computer is restored from backup.

Long duration synchronization happens when: Machines have been apart for a significant time period such as a long duration as defined above, with the occurrence of a change between the machines. A synchronization blocking error is posted into the Sync Handler of the older machine. The users on the older machine, whose accounts are not in conflict with the rest of the unmanaged secured workgroup, are able to use the machine normally. In an illustrative embodiment of the invention, a synchronization blocking error allows the administrator on that machine to resolve the synchronization by offering the following choices:

Discard all changes from the older machine and pick the latest changes. This choice is equivalent to the older machine joining the unmanaged secured workgroup for the first time.

Synchronize changes from the older machine. In an embodiment of the invention, if the user picks this choice, the synchronization between the machines will happen as if the machines were apart for a short duration. Other embodiments of the invention do not differentiate between long and short duration conflicts so that all conflicts are treated as short duration conflicts.

Short duration synchronization occurs when machines have been apart for a short duration, from the last occurrence of changes between the machines. Handling of short duration synchronization depends on the nature of the changes to be synchronized. An illustrative embodiment of the invention supports the following changes with the associated resolutions.

Non-conflicting changes:
An account is added on one machine: Resolved by creating the same account on the other machine.

User account is deleted on one machine: Resolved by deleting the same account on the other machine. If a machine is a member, at the time of deleting the account on the older machine, the administrator on that machine will be cautioned about the impact of such deletion on the remaining members.

A property of an account is changed on one machine: Resolved by changing the same property of the same account on the other machine.

A user group is added on one machine: Resolved by creating the same user group on the other machine.

A user group is deleted on one machine: Resolved by deleting the same user group on the other machine. If a machine is a member, at the time of deleting the user group on the older machine, the administrator on that machine is cautioned about the impact of such deletion on the remaining members Membership of a user group is changed on one machine: Resolved by changing the membership of the same group on the other machine.

Swap display names of two users: Resolved by swapping the names on the other machines. Note that this may result in duplicate display names on a machine.

However, since the user accounts are identified by a GUID (Globally Unique Identifier), the change is a non-conflicting change.

Conflicting changes:

Same user account is changed on two different machines: Resolved by posting a synchronization blocking error and excluding that user from participating in an unmanaged secured workgroup on the older machine until the user or the administrator resolves the conflict.

With an embodiment of the invention, all conflicts are treated uniformly. There is no differentiation between long duration and short duration conflicts. All conflicts are treated as short duration conflicts.

With an embodiment of the invention, a conflict is generated if a new account does not match any local account by GUID and has a same name as a local account.

Conflicts in accounts of an unmanaged secured workgroup are presented via integration with a conflict management user interface. An individual user, if on the current machine, is notified about the conflict when the user's account is in conflict. An administrator on any member machine is notified of all the account conflicts within the unmanaged secured workgroup as viewed from the machine on which the administrator is logged in. In other words, if different machines in the unmanaged secured workgroup have different accounts in conflict on different machines, the view is different on each machine.

A resolution of a conflict is considered to have converged if the resulting choice of the account change is replicated to all the member machines. As account conflicts are resolved on an individual machine, corresponding changes are replicated on other machines. Depending on the nature of the conflict resolved, some existing conflicts on other machines may be resolved as conflicts on the current machine are resolved.

The unmanaged secured workgroup depends on the ability of multiple machines to communicate over a network and to be able to change their state in response to changes to member machines. The network and the participating machines may fail in a number of ways. Therefore, there is a need to have the unmanaged secured workgroup function in such a way that a member machine and the unmanaged secured workgroup as a whole can predictably handle errors, failures and do the cleanup and recover from such errors and failures. The unmanaged secured workgroup may handle errors and failures in general by employing a marker flag before starting an atomic transaction. If the transaction fails for any reason, the flag is noted and cleanup is performed when the service is started the next time. The replication action is designed to automatically resume when machines become available, and thus failures during replication are handled automatically. If the feature installation on a machine is damaged in any way, the service stops on that machine and the machine no longer participates in an unmanaged secured workgroup.

The unmanaged secured workgroup, in accordance with aspects of the invention, supports numerous user scenarios. By way of example, one user scenario involves "roaming parental control" in a home network. A parent can create parental control restrictions that limit how a child can use the computers. The parental control restrictions are replicated to all the computers in the group. Thus, when the child logs onto any of the computers in the group, the parental control restrictions "follow" the child regardless of which computer the child is using. In addition, the audit report of the child is updated with all of the child's activities on each computer in the group. In accordance with illustrative embodiments of the invention, user scenarios support, among other features, roaming, sharing data objects, and backing up data objects for a user in an unmanaged secured workgroup. The user scenarios are built upon the trust and user data replication within the unmanaged secured workgroup.

An illustrative embodiment of the invention provides a set of interfaces (application programming interface (API)) that can be used by applications or other services to query properties and the members of the unmanaged secured workgroup and to initiate actions within the unmanaged secured workgroup.

An illustrative embodiment of the invention supports the following interfaces:

IWorkgroupNetInformation—provides a list of unmanaged secured workgroups and unaffiliated computers within a local area network.

IWorkgroupInformation—provides information about a given unmanaged secured workgroup including attributes of the feature as a whole and a list of member computers.

IWorkgroupComputerInformation—provides information about a computer within an unmanaged secured workgroup.

IWorkgroupNetControl—allows one to create a new unmanaged secured workgroup.

IWorkgroupControl—allows you to make a computer join or leave an unmanaged secured workgroup.

The IWorkgroupNetInformation interface provides information about the unmanaged secured workgroup.

```
interface IWorkgroupNetInformation : IUnknown
{
    //
    // Creates an enumerator for known workgroups.
    //
    HRESULT GetWorkgroups([out] IEnumWorkgroups** ppEnum);
    //
    // Provides the interface for a known workgroups by name.
    // If the computer currently belongs to a workgroups,
    pszWorkgroup
    // can be empty string to indicate the current workgroup.
    //
    // if pszWorkgroupGUID is an empty string and the current
    // computer isn't a member of a workgroup, GetWorkgroup will
    // return S_FALSE and set *ppWorkgroup to NULL.
    //
    HRESULT GetWorkgroup([in,string] LPCWSTR
    pszWorkgroupGUID,
              [out] IWorkgroupInformation** ppWorkgroup);
    //
    // Creates an enumerator for known unaffiliated computers.
    //
    HRESULT GetComputers([out] IEnumString** ppEnum);
    //
    // registration for change notifications
    //
    HRESULT Advise([in] IUnknown* pUnk, [out] DWORD*
    pdwCookie);
    HRESULT Unadvise(DWORD dwCookie);
}
```

IEnumWorkgroups and IEnumComputers are both derived from IEnumerable. IEnumWorkgroups returns IWorkgroupInformation interfaces, each one of which represents a known unmanaged secured workgroup. IEnumComputers returns LPWSTRs each of which is the name of a known computer not affiliated with any unmanaged secured workgroup.

```
interface IEnumWorkgroups : IUnknown
{
    HRESULT Next([in] ULONG celt,
        [out, size_is(celt),
        length_is(*pceltFetched)] IWorkgroupInformation** rgelt,
        [out] ULONG* pceltFetched);
    HRESULT Skip([in] ULONG celt);
    HRESULT Reset( );
    HRESULT Clone([out] IEnumWorkgroups** ppEnumWorkgroups);
}
interface IEnumComputers : IUnknown
{
    HRESULT Next([in] ULONG celt,
        [out, size_is(celt),
        length_is(*pceltFetched)] IWorkgroupComputerInformation** rgelt,
        [out] ULONG* pceltFetched);
    HRESULT Skip([in] ULONG celt);
    HRESULT Reset( );
    HRESULT Clone([out] IEnumComputers** ppEnumComputers);
}
```

For change notifications, IWorkgroupNetInformation::Advise will accept an IWorkgroupNetInformationAdvise.

```
interface IWorkgroupNetInformationAdvise : IUnknown
{
    //
    // Notifications for workgroup discovery
    //
    HRESULT OnWorkgroupFound([in] IWorkgroupInformation* pWI);
    HRESULT OnWorkgroupLost([in] IWorkgroupInformation* pWI);
    //
    // Notifications for computer discovery
    //
    HRESULT OnComputerFound([in, string] LPCWSTR pszComputer);
    HRESULT OnComputerLost([in, string] LPCWSTR pszComputer);
    }
}
```

The IWorkgroupInformation interface provides information about a given unmanaged secured workgroup including attributes of the unmanaged secured workgroup as a whole and a list of member computers.

```
interface IWorkgroupInformation : IUnknown
{
    //
    // Get the primary name of the Workgroup
    //
    // Returned name string must be freed with
    CoTaskMemFree( ).
    //
    HRESULT GetName([out,string] LPWSTR* ppszName);
    //
    // Get the unique identity (GUID) for the Workgroup
    //
    // The unique identity will never change during the
    lifetime of the
    // Workgroup - use this for references
    //
    HRESULT GetGUID([out,string] LPWSTR* ppszGUID);
    //
    // Get the time that the Workgroup was created
    //
    HRESULT GetCreationTime([out] FILETIME* pft);
    //
    // Get an enumerator for the computers in the Workgroup
    //
    HRESULT GetComputers([out] IEnumComputers** ppEnum);
    //
    // registration for change notifications
```

```
    //
    HRESULT Advise([in] IUnknown* pUnk, [out] DWORD*
pdwCookie);
    HRESULT Unadvise(DWORD dwCookie);
}
```

For change notifications, IWorkgroupInformation::Advise accepts an IWorkgroupInformationAdvise.

```
interface IWorkgroupInformationAdvise : IUnknown
{
    //
    // Notifications for workgroup membership changes.
    //
    // Note: not supported for IWorkgroupInformation
    // corresponding to any workgroup other than the
    // one to which the local computer belongs.
    //
    HRESULT OnMemberAdded([in]
        IWorkgroupComputerInformation*
pComputer);
    HRESULT OnMemberRemoved([in]
        IWorkgroupComputerInformation*
pComputer);
    //
    // Notifications for workgroup member state changes
    //
    HRESULT OnMemberStateChanged([in]
        IWorkgroupComputerInformation*
pComputer);
}
```

The IWorkgroupComputerInformation provides information about a computer within an unmanaged secured work group.

```
interface IWorkgroupComputerInformation : IUnknown
{
    //
    // Get the name of the computer
    //
    // Returned name string must be freed with CoTaskMemFree( ).
    //
    HRESULT GetName([out,string] LPWSTR* ppszName);
    //
    // Get the description of the computer
    //
    // Returned name string must be freed with CoTaskMemFree( ).
    //
    HRESULT GetDescription([out,string] LPWSTR* ppszDescription);
    //
    // Get the last time that the computer was synchronized with the
    Workgroup
    //
    // Returned values can be zero, meaning unknown
    //
    HRESULT GetLastSyncTime([out] FILETIME* pft);
    //
    // Get the unique identity (GUID) for the Computer
    //
    // The unique identity will never change during the lifetime of
    the Computer in
    // the Workgroup - use this for references
    //
    HRESULT GetUniqueID([out] GUID* pGUID);
}
    }
```

The IWorkgroupNetControl interface is acquired via QueryInterface (QI) from an IWorkgroupNetInformation.

```
interface IWorkgroupNetControl : IUnknown
{
    //
    // Creates a new workgroup with the current unaffiliated
    // machine becoming the first member, i.e. creates a
    // workgroup-of-one.
    //
    HRESULT Create([in, string] LPCWSTR
    pszWorkgroupAdminPassword,
            [out] IWorkgroupInformation** ppWorkgroup);
    //
    // Unjoins the computer from its current workgroup.
    // The computer then reverts to an unjoined state.
    //
    HRESULT Leave( );
}
```

The IWorkgroupControl interface is acquired via QI from an IWorkgroupInformation.

```
interface IWorkgroupControl : IUnknown
{
    //
    // Joins the computer to the specified workgroup.
    //
    HRESULT Join([in,string] LPCWSTR pszAdminPassword);
    //
    // Evicts the specified computer from the workgroup
    //
    HRESULT Evict([in,string] LPCWSTR pszComputer);
}
```

Figure 9:
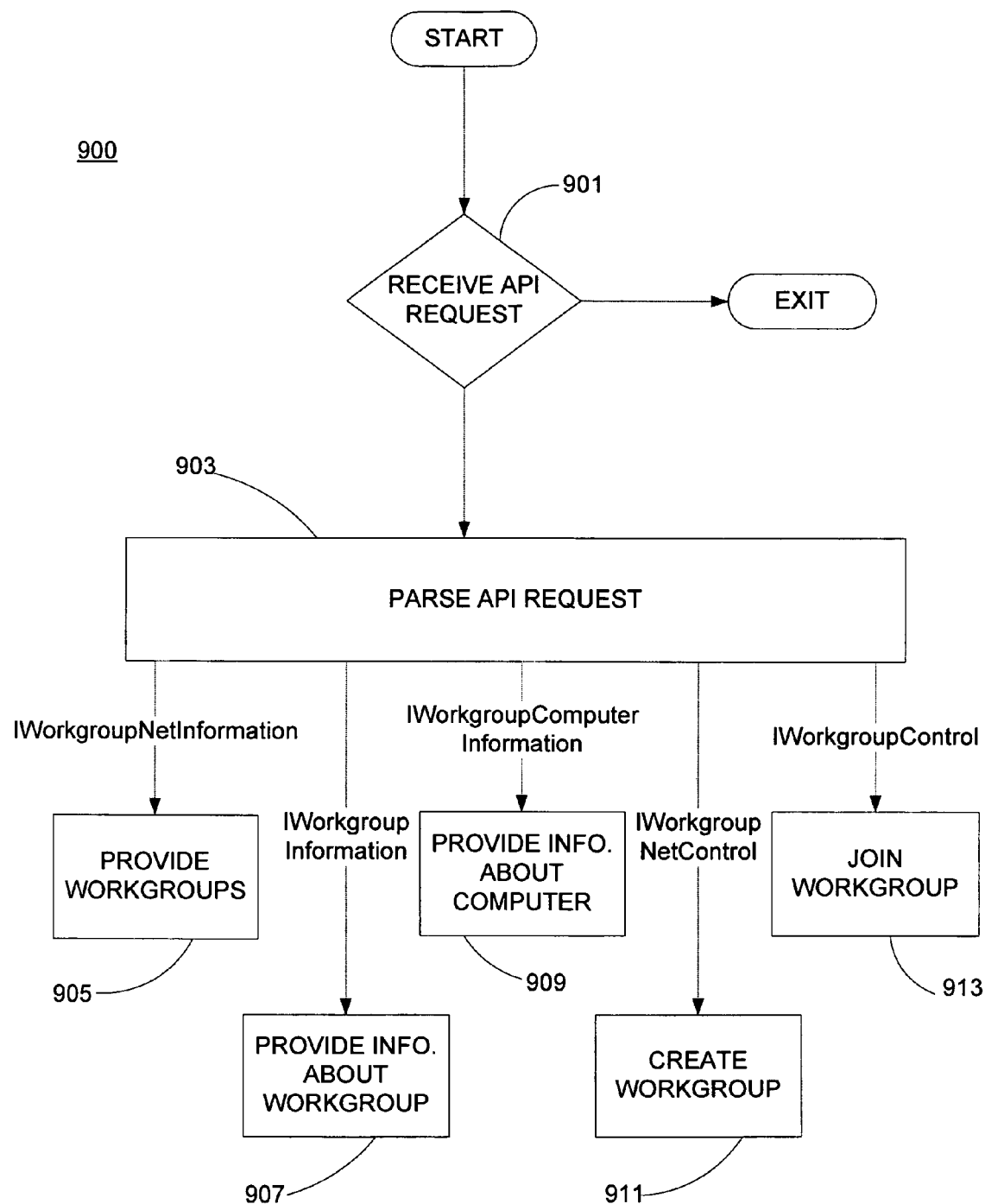
FIG. 9 shows an architecture for supporting an application programming interface (API) in an unmanaged secured workgroup in accordance with an illustrative embodiment of the invention.

FIG. 9 shows a flow diagram 900 that supports an application programming interface (API) in an unmanaged secured workgroup in accordance with an illustrative embodiment of the invention. If an application (e.g., application 121 as shown in FIG. 2) generates an API request in step 901, the API request is parsed in step 903 to determine the API type and the corresponding parameters (e.g., unmanaged secured workgroup id). Consequently, the API request message is processed for the supported API types as shown in steps 905-913.

An application programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 10A:
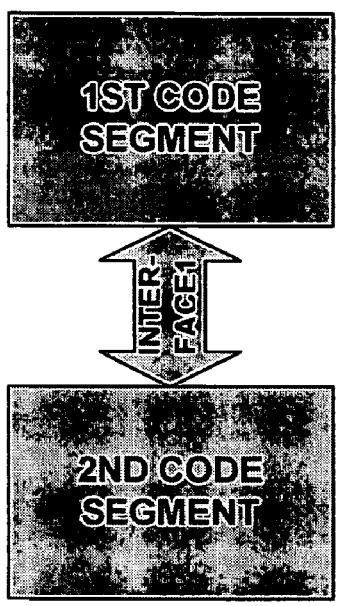
FIGS. 10A-B show generic programming interfaces in accordance with an illustrative embodiment of the invention.
Figure 10B:
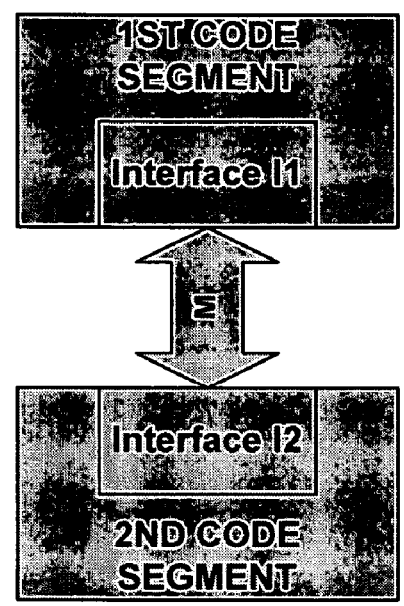

Notionally, a programming interface may be viewed generically, as shown in FIG. 10A or FIG. 10B. FIG. 10A illustrates an interface Interface1 as a conduit through which first and second code segments communicate. FIG. 10B illustrates an interface as comprising interface objects I1 and I2 (which may or may not be part of the first and second code segments), which enable first and second code segments of a system to communicate via medium M. In the view of FIG. 10B, one may consider interface objects I1 and I2 as separate interfaces of the same system and one may also consider that objects I1 and I2 plus medium M comprise the interface. Although FIGS. 10A and 10B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 10A and 10B, but they nonetheless perform a similar function to accomplish the same overall result. We will now briefly describe some illustrative alternative implementations of a programming interface.

Figure 11A:
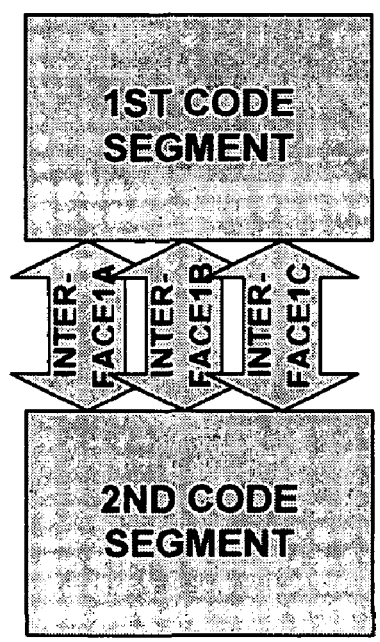
FIGS. 11A-B show factored programming interfaces in accordance with an illustrative embodiment of the invention.
Figure 11B:
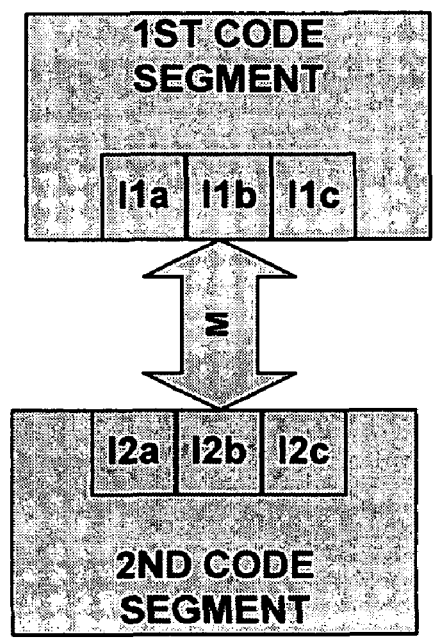

A communication from one code segment to another may be accomplished indirectly by breaking the communication into multiple discrete communications. This is depicted schematically in FIGS. 11A and 11B. As shown, some interfaces can be described in terms of divisible sets of functionality. Thus, the interface functionality of FIGS. 10A and 10B may be factored to achieve the same result, just as one may mathematically provide 24, or 2 times 2 time 3 times 2. Accordingly, as illustrated in FIG. 11A, the function provided by interface Interface1 may be subdivided to convert the communications of the interface into multiple interfaces Interface1A, Interface 1B, Interface 1C, etc. while achieving the same result. As illustrated in FIG. 11B, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 11A and 11B, the functional spirit of interfaces Interface1 and I1 remain the same as with FIGS. 10A and 10B, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

Figure 12A:
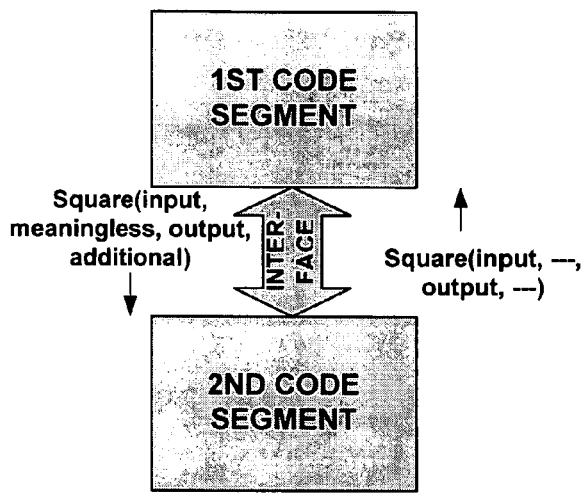
FIGS. 12A-B show redefined programming interfaces in accordance with an illustrative embodiment of the invention.
Figure 12B:
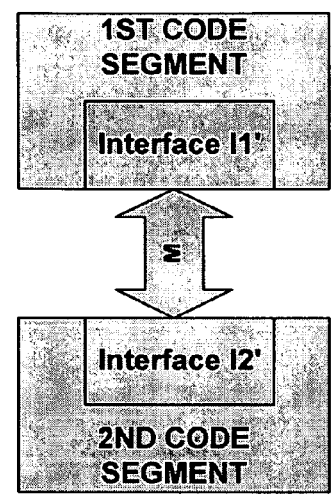

In some cases, it may be possible to ignore, add or redefine certain aspects (e.g., parameters) of a programming interface while still accomplishing the intended result. This is illustrated in FIGS. 12A and 12B. For example, assume interface Interface1 of Figure A1 includes a function call Square(input, precision, output), a call that includes three parameters, input, precision and output, and which is issued from the 1st Code Segment to the 2nd Code Segment, If the middle parameter precision is of no concern in a given scenario, as shown in FIG. 12A, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 12B, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

Figure 13A:
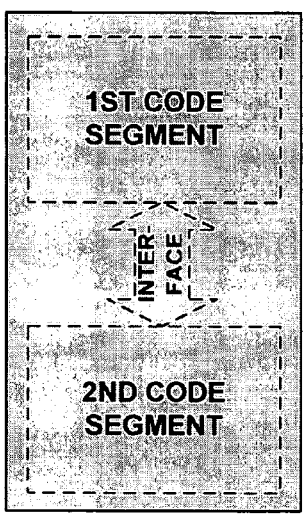
FIGS. 13A-B show programming interfaces with merged functionality in accordance with an illustrative embodiment of the invention.
Figure 13B:
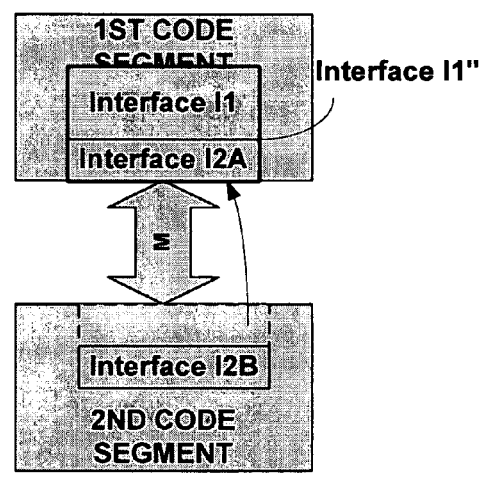

It may also be feasible to merge some or all of the functionality of two separate code modules such that the "interface" between them changes form. For example, the functionality of FIGS. 10A and 10B may be converted to the functionality of FIGS. 13A and 13B, respectively. In FIG. 13A, the previous 1st and 2nd Code Segments of FIG. 10A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 13B, part (or all) of interface I2 from FIG. 10B may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 10B performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

Figure 14A:
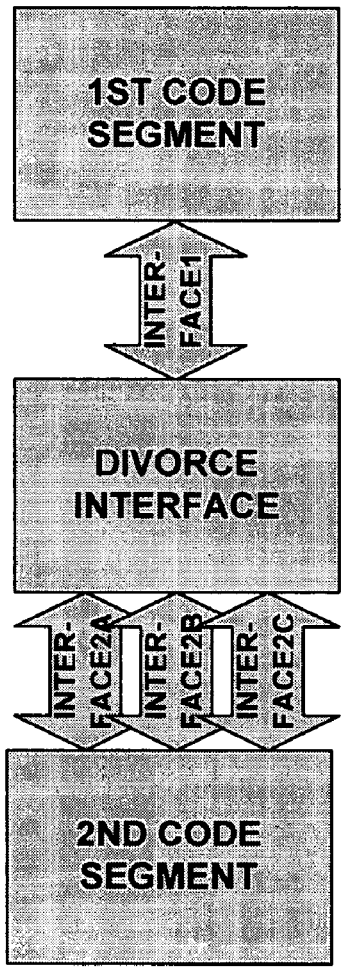
FIGS. 14A-B show programming interfaces with divorced functionality in accordance with an illustrative embodiment of the invention.
Figure 14B:
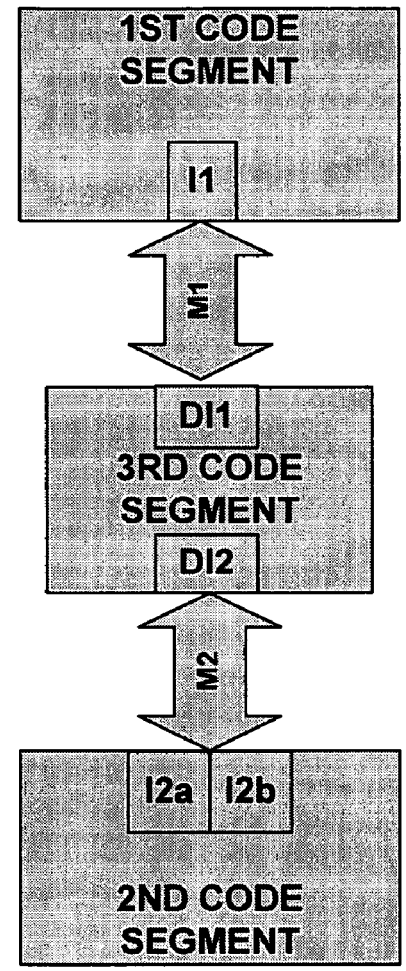

A communication from one code segment to another may be accomplished indirectly by breaking the communication into multiple discrete communications. This is depicted schematically in FIGS. 14A and 14B. As shown in FIG. 14A, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 14B, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 10B to a new operating system, while providing the same or similar functional result.

Figure 15A:
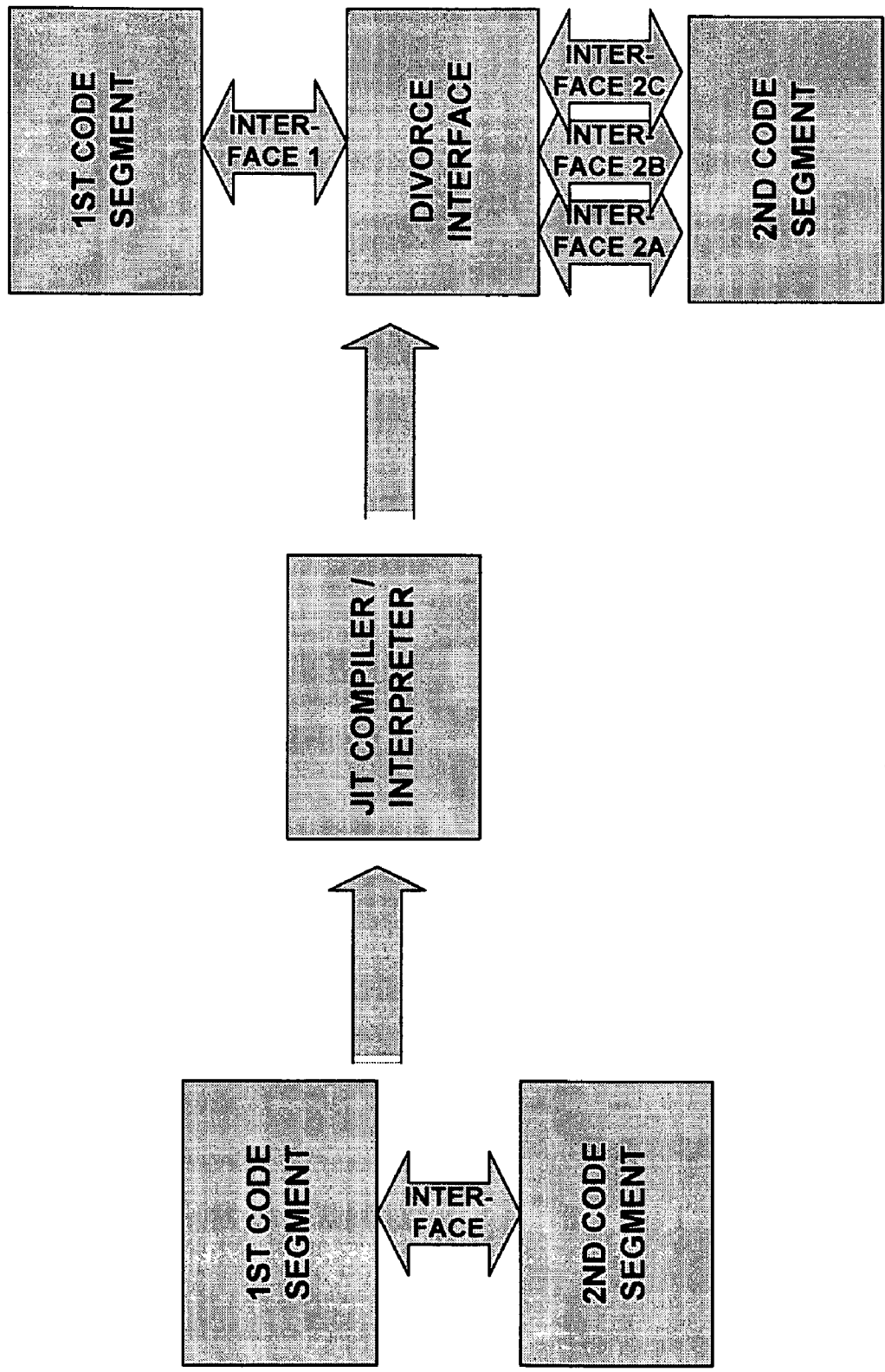
FIGS. 15A-B show programming interfaces by dynamically rewriting code to replace interface functionality in accordance with an illustrative embodiment of the invention.
Figure 15B:
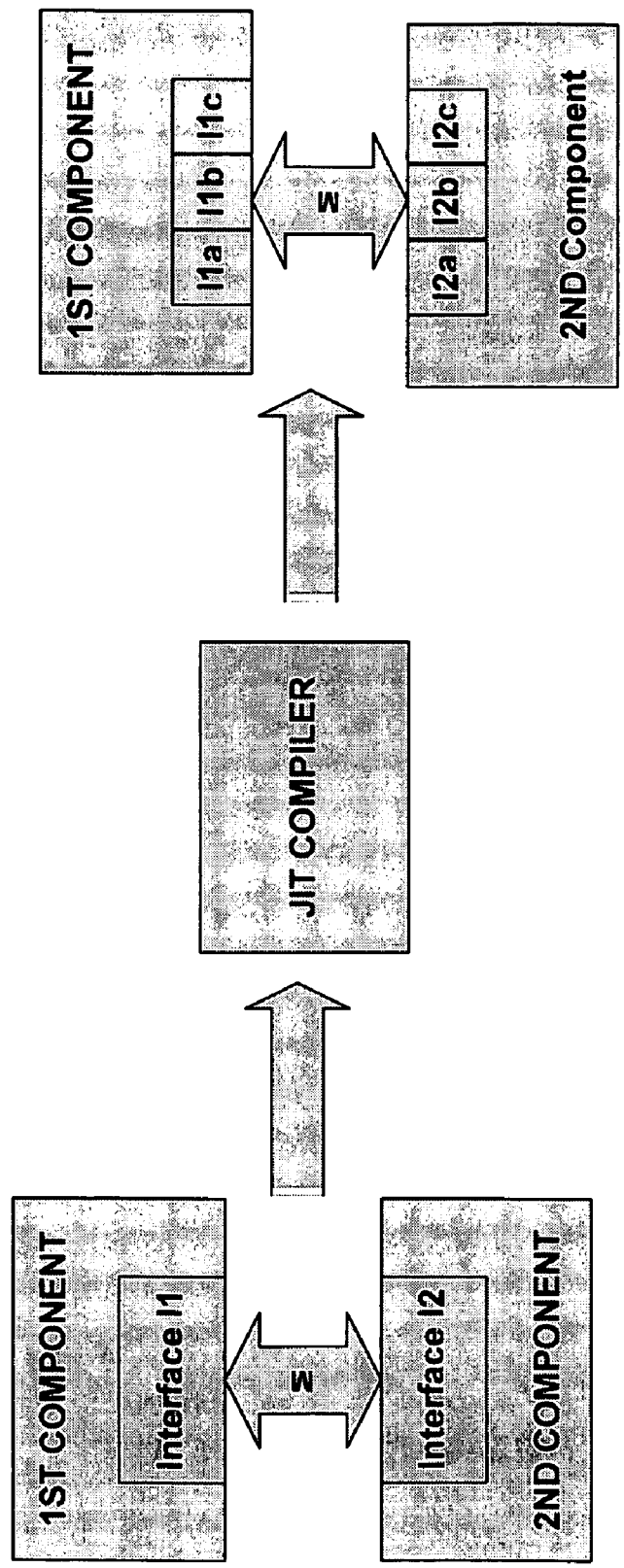

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 15A and 15B. As can be seen in FIG. 15A, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 15B, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 10A and 10B. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. One or more computer storage media having computer-executable instructions stored thereon in a first computer, said instructions configured to perform a method comprising the steps of:
   (a) joining the first computer to an unmanaged secured workgroup by coordinating with one or more members of the unmanaged secured workgroup to acquire membership in the unmanaged secured workgroup,
   wherein the unmanaged secured workgroup comprises a plurality of computers in communication with one another,
   wherein each of the plurality of computers has account information comprising (1) one or more user accounts, each user account comprising a user name, a password, and an account version and (2) a user profile associated with each user account, the user profile comprising at least one of settings, configurations, and files, and
   wherein each of the plurality of computers has stored therein a copy of the account information of at least two other computers in the unmanaged secured workgroup;
   (b) providing first account information that is associated with the first computer to at least two other computers in the unmanaged secured workgroup for storage;
   (c) obtaining associated account information from at least two other computers in the unmanaged secured workgroup;
   (d) storing the associated account information of the at least two other computers; and
   (e) upon determining that a change in the first account information has occurred, providing the change to other computers in the unmanaged secured workgroup that were previously provided the first account information of the first computer by:
   (e)(1) advertising the change to said other computers;
   (e)(2) receiving a first request from a second computer in the unmanaged secured workgroup, the first request for a list of user accounts stored on the first computer, the list including an account version for each user account;
   (e)(3) in response to (e)(2), sending the list of user accounts to the second computer;
   (e)(4) receiving a second request from the second computer, the second request for one or more specific user accounts and associated user profiles that the second computer has identified as updated or new based on the account version of each of the specific user accounts; and
   (e)(5) in response to (e)(4), sending the specific user accounts and associated user profiles to the second computer.

2. The computer storage media of claim 1, wherein at least one property of at least one of the specific user accounts or associated user profiles has been modified.

3. The computer storage media of claim 1, wherein at least one of the one or more specific user accounts is a new user account added to the first account information.

4. The computer storage media of claim 1, having further computer-executable instructions to perform:
   (f) upon determining that a change in account information has occurred at a computer other than the first computer that is a member of the unmanaged secured workgroup:
   (f)(1) obtaining specific account information relating to the change from the computer other than the first computer; and
   (f)(2) automatically synchronizing the specific account information between the first computer and the computer other than the first computer.

5. The computer storage media of claim 4, wherein (f)(2) includes computer-executable instructions to perform:
   (f)(2)(i) detecting whether there is a conflict between the specific account information relating to the change obtained from the computer other than the first computer and account information relating to the change stored on the first computer;
   (f)(2)(ii) resolving a detected conflict;
   (f)(2)(iii) updating a user account data structure with the specific specific account information; and
   (f)(2)(iv) publishing a resolved conflict to other members of the unmanaged secured workgroup.

6. The computer storage media of claim 4, wherein the change in account information at the computer other than the first computer is determined in (f) based on
   receiving an advertisement from the computer other than the first computer.

7. The computer storage media of claim 4, wherein (f)(1) includes computer-executable instructions to perform:
   (f)(1)(i) requesting the computer other than the first computer to provide a list of user accounts including an account version for each user account.

8. The computer storage media of claim 7, wherein (f)(1) includes computer-executable instructions to perform:
   (f)(1)(ii) receiving the requested list of user accounts including account versions;
   (f)(1)(iii) determining that one or more accounts are updated or new based on the account version;
   (f)(1)(iv) requesting account information for the one or more updated or new accounts; and
   (f)(1)(v) in response to (f)(1)(iv), receiving the account information for the one or more updated or new accounts.

9. The computer storage media of claim 8, wherein the first account information is deleted.

10. The computer storage media of claim 1, wherein each computer in the unmanaged secured workgroup has stored therein a copy of the account information of every other computer in the unmanaged secured workgroup.

11. One or more computer storage media having computer-executable instructions stored thereon in a first computer, said instructions configured to perform a method comprising the steps of:
    (a) sending a self-signed certificate to a second computer to establish a computer account for the first computer on the second computer, wherein the second computer is a member of an unmanaged secured workgroup comprising a plurality of computers in communication with one another, and wherein the first computer is a nonmember of the unmanaged secured workgroup, wherein each of the plurality of computers in the unmanaged secured workgroup has an associated computer account having a computer account version, each of the plurality of computers in the unmanaged secured workgroup also having user account information comprising (1) one or more user accounts, each user account comprising a user name, a password, and an account version and (2) a user profile associated with each user account, the user profile comprising at least one of settings, configurations, and files, and wherein each computer in the unmanaged secured workgroup has stored therein a copy of the computer account and user account information of at least two other computers in the unmanaged secured workgroup;

(b) storing on the first computer an associated certificate of the second computer, a shared secret, and a copied certificate of the unmanaged secured workgroup;

(c) creating a computer account for the second computer on the first computer;

(d) broadcasting that the first computer is a workgroup member of the unmanaged secured workgroup;

(e) synchronizing the computer account and user account information stored on the first computer with the computer accounts and user account information stored on the second computer;

(f) upon determining that a change in the first computer's user account information has occurred, providing the change to other computers in the unmanaged secured workgroup that were previously provided the first computer's user account information by:

(f)(1) advertising the change to said other computers;

(f)(2) receiving a first request from a requesting computer in the unmanaged secured workgroup, the first request for a list of user accounts stored on the first computer, the list including an account version for each user account;

(f)(3) in response to (f)(2), sending the list of user accounts to the requesting computer;

(f)(4) receiving, a second request from the requesting computer, the second request for one or more specific user accounts and associated user profiles that the requesting computer has identified as updated or new based on the account version of each of the specific accounts; and (f)(5) in response to (f)(4), sending the specific user accounts and associated user profiles to the requesting computer.

12. The computer storage media of claim 11, wherein each computer in the unmanaged secured workgroup has stored therein a copy of the account information of every other computer in the unmanaged secured workgroup.

13. One or more computer storage media having computer-executable instructions stored thereon in a first computer, said instructions configured to perform a method comprising the steps of:

(a) joining the first computer to an unmanaged secured workgroup by coordinating with one or more members of the unmanaged secured workgroup to acquire membership in the unmanaged secured workgroup, wherein the unmanaged secured workgroup comprises a plurality of computers in communication with one another, wherein each of the plurality of computers has account information comprising (1) one or more user accounts, each user account comprising a user name, a password, and an account version and (2) a user profile associated with each user account, the user profile comprising at least one of settings, configurations, and files, and wherein each of the plurality of computers has stored therein a copy of the account information of at least two other computers in the unmanaged secured workgroup;

(b) providing first account information that is associated with the first computer to at least two other computers in the unmanaged secured workgroup for storage;

(c) obtaining associated account information from at least two other computers in the unmanaged secured workgroup;

(d) storing the associated account information of the at least two other computers; and (e) upon determining that a change in the first account information has occurred, providing the change to other computers in the unmanaged secured workgroup that were previously provided the first account information of the first computer by:

(e)(1) advertising the change to said other computers;

(e)(2) receiving, from a second computer in the unmanaged secured workgroup, an account version for each account stored on the second computer; and (e)(3) in response to (e)(2), sending a list of newer user accounts.

14. The computer storage media of claim 13, wherein each computer in the unmanaged secured workgroup has stored therein a copy of the account information of every other computer in the unmanaged secured workgroup.

* * * * *

UNITED STATES PATENT AND TRADEMARK OFFICE
CERTIFICATE OF CORRECTION

Page 1 of 1

PATENT NO.        : 7,958,543 B2
APPLICATION NO.   : 11/179764
DATED             : June 7, 2011
INVENTOR(S)       : Mohammed Samji et al.

It is certified that error appears in the above-identified patent and that said Letters Patent is hereby corrected as shown below:

In column 26, line 31, in Claim 5, delete "specific specific account" and insert -- specific account --, therefor.

Signed and Sealed this
Sixteenth Day of August, 2011

David J. Kappos
*Director of the United States Patent and Trademark Office*